(12) United States Patent
Kuno et al.

(10) Patent No.: US 11,173,653 B2
(45) Date of Patent: Nov. 16, 2021

(54) THREE-DIMENSIONAL INKJET PRINTING USING POLYAMIDE-FORMING MATERIALS

(71) Applicant: Stratasys Ltd., Rehovot (IL)

(72) Inventors: Lev Kuno, Tzur-Hadassah (IL); Ira Yudovin-Farber, Rehovot (IL); Liora Damari, Rehovot (IL); Eynat Matzner, Doar-Na HaMovil (IL)

(73) Assignee: Stratasys Ltd., Rehovot (IL)

( * ) Notice: Subject to any disclaimer, the term of this patent is extended or adjusted under 35 U.S.C. 154(b) by 229 days.

(21) Appl. No.: 16/075,157

(22) PCT Filed: Feb. 5, 2017

(86) PCT No.: PCT/IL2017/050136
§ 371 (c)(1),
(2) Date: Aug. 3, 2018

(87) PCT Pub. No.: WO2017/134672
PCT Pub. Date: Aug. 10, 2017

(65) Prior Publication Data
US 2019/0176387 A1 Jun. 13, 2019

Related U.S. Application Data

(60) Provisional application No. 62/291,629, filed on Feb. 5, 2016.

(51) Int. Cl.
*B29C 64/112* (2017.01)
*C08L 77/02* (2006.01)
(Continued)

(52) U.S. Cl.
CPC .......... *B29C 64/112* (2017.08); *B29C 64/129* (2017.08); *B29C 64/209* (2017.08);
(Continued)

(58) Field of Classification Search
CPC .... C08G 2261/40; C08G 69/14; C08G 69/16; C08G 69/18; C08G 69/20; C08G 69/22;
(Continued)

(56) References Cited

U.S. PATENT DOCUMENTS 5,059,266 A   10/1991   Yamane et al.
5,312,940 A   5/1994    Grubbs et al.
(Continued)

FOREIGN PATENT DOCUMENTS

CN   101538364   9/2009
CN   103338864   10/2013
(Continued)

OTHER PUBLICATIONS

Khodabakhshi, Khosrow. Anionic polymarisation of caprolactam: an approach to optimising thr polymerisation condition to be used in the jetting process. Diss. © Khosrow Khodabakhshi, 2011. (Year: 2011).*

(Continued)

*Primary Examiner* — Leith S Shafi

(57) ABSTRACT

Formulation systems usable for fabricating a three-dimensional object made of a polyamide-containing material, by three-dimensional 3D inkjet printing, and methods and systems utilizing same, are provided. The formulation systems are formed of at least a first and second model formulations containing a lactam and a catalyst for inducing anionic ring opening polymerization of the lactam in the first formulation, and an activator for promoting anionic ring opening polymerization of the lactam in the second formulation, and are further characterized as: including in the first and/or second formulation a compound capable of increasing a rate of said polymerization upon exposure to said curing energy; including as an activator a lactam-blocked polyisocyanate; and/or as including in the first model for- (Continued)

mulation at least one material capable of reducing a melting point of said first model formulation. Formulation systems usable at a selected ratio are also provided.

5 Claims, 6 Drawing Sheets

(51) Int. Cl.
| | | |
|---|---|---|
| C08K 5/17 | (2006.01) | |
| B33Y 70/00 | (2020.01) | |
| B33Y 10/00 | (2015.01) | |
| B33Y 30/00 | (2015.01) | |
| C08G 69/20 | (2006.01) | |
| B29C 64/209 | (2017.01) | |
| B29C 64/393 | (2017.01) | |
| B29C 64/129 | (2017.01) | |
| C08G 69/18 | (2006.01) | |
| B33Y 50/00 | (2015.01) | |
| C08K 5/29 | (2006.01) | |
| C08L 71/02 | (2006.01) | |
| C08L 79/02 | (2006.01) | |

(52) U.S. Cl.
CPC ............ *B29C 64/393* (2017.08); *B33Y 10/00* (2014.12); *B33Y 30/00* (2014.12); *B33Y 70/00* (2014.12); *C08G 69/18* (2013.01); *C08G 69/20* (2013.01); *C08K 5/17* (2013.01); *C08L 77/02* (2013.01); *B33Y 50/00* (2014.12); *C08K 5/29* (2013.01); *C08L 71/02* (2013.01); *C08L 79/02* (2013.01)

(58) Field of Classification Search
CPC ..... C08G 69/24; B29C 64/112; B29C 64/209; B29C 64/393; B29C 64/129; C08K 5/17; C08K 5/29; B33Y 70/00; B33Y 10/00; B33Y 30/00; B33Y 50/00; C08L 77/02; C08L 71/02; C08L 79/02
See application file for complete search history.

(56) References Cited

U.S. PATENT DOCUMENTS

| | | | |
|---|---|---|---|
| 5,342,909 | A | 8/1994 | Grubbs et al. |
| 5,491,200 | A | 2/1996 | Harris et al. |
| 5,710,298 | A | 1/1998 | Grubbs et al. |
| 5,728,917 | A | 3/1998 | Grubbs et al. |
| 5,831,108 | A | 11/1998 | Grubbs et al. |
| 6,001,909 | A | 12/1999 | Setiabudi |
| 6,259,962 | B1 | 7/2001 | Gothait |
| 6,569,373 | B2 | 5/2003 | Napadensky |
| 6,658,314 | B1 | 12/2003 | Gothait |
| 6,850,334 | B1 | 2/2005 | Gothait |
| 7,183,335 | B2 | 2/2007 | Napadensky |
| 7,209,797 | B2 | 4/2007 | Kritchman et al. |
| 7,225,045 | B2 | 5/2007 | Gothait et al. |
| 7,300,619 | B2 | 11/2007 | Napadensky et al. |
| 7,479,510 | B2 | 1/2009 | Napadensky et al. |
| 7,500,846 | B2 | 3/2009 | Eshed et al. |
| 7,962,237 | B2 | 6/2011 | Kritchman |
| 8,487,046 | B2 | 7/2013 | Recher et al. |
| 8,519,069 | B2 | 8/2013 | Drozdzak |
| 8,703,888 | B2 | 4/2014 | Drozdzak et al. |
| 8,927,670 | B2 | 1/2015 | Schaubroeck et al. |
| 9,139,752 | B2 | 9/2015 | Desbois et al. |
| 10,259,210 | B2 | 4/2019 | Vidavsky et al. |
| 10,589,511 | B2 | 3/2020 | Vidavsky et al. |
| 2002/0055598 | A1 | 5/2002 | Lynn et al. |
| 2002/0111707 | A1 | 8/2002 | Li et al. |
| 2003/0032758 | A1 | 2/2003 | Harris et al. |
| 2004/0256754 | A1 | 12/2004 | Koguchi |
| 2005/0040564 | A1 | 2/2005 | Oliver et al. |
| 2006/0111807 | A1 | 5/2006 | Gothait et al. |
| 2007/0168815 | A1 | 7/2007 | Napadensky et al. |
| 2008/0023884 | A1 | 1/2008 | Konze et al. |
| 2009/0156766 | A1 | 6/2009 | Lemcoff et al. |
| 2010/0029801 | A1 | 2/2010 | Moszner et al. |
| 2011/0171147 | A1 | 7/2011 | Samorski et al. |
| 2012/0065755 | A1 | 3/2012 | Steingart et al. |
| 2012/0283406 | A1 | 11/2012 | Klitschke et al. |
| 2013/0065466 | A1* | 3/2013 | Desbois .................. B32B 5/028 442/54 |
| 2013/0073068 | A1 | 3/2013 | Napadensky |
| 2013/0128452 | A1 | 5/2013 | Baquiano et al. |
| 2013/0183519 | A1 | 7/2013 | Maeda |
| 2017/0251713 | A1 | 9/2017 | Warner et al. |
| 2017/0306171 | A1 | 10/2017 | Vidavsky et al. |
| 2017/0341296 | A1 | 11/2017 | Fenn et al. |
| 2018/0029291 | A1 | 2/2018 | Matzner et al. |
| 2019/0039321 | A1 | 2/2019 | Matzner et al. |
| 2019/0048217 | A1 | 2/2019 | Vidavsky et al. |
| 2019/0127517 | A1 | 5/2019 | Vidavsky et al. |
| 2019/0210354 | A1 | 7/2019 | Vidavsky et al. |
| 2020/0207070 | A1 | 7/2020 | Vidavsky et al. |

FOREIGN PATENT DOCUMENTS

| | | | |
|---|---|---|---|
| CN | 104487221 | 4/2015 | |
| EP | 1498256 | 1/2005 | |
| EP | 1757613 | 2/2007 | |
| EP | 2280017 | 2/2011 | |
| EP | 2452958 | 5/2012 | |
| EP | 2460587 | 6/2012 | |
| EP | 2801588 | 11/2014 | |
| GB | 2382798 | 6/2003 | |
| JP | 2002-264221 | 9/2002 | |
| JP | 2005-254583 | 9/2005 | |
| JP | 2010-095706 | 4/2010 | |
| JP | 2010-214858 | 9/2010 | |
| JP | 2014-506260 | 3/2014 | |
| JP | 2014-526581 | 10/2014 | |
| WO | WO 97/20865 | 6/1997 | |
| WO | WO 97/29135 | 8/1997 | |
| WO | WO 99/51344 | 10/1999 | |
| WO | WO 2009/013751 | 1/2009 | |
| WO | WO 2013/072874 | 5/2013 | |
| WO | WO 2013/128452 | 9/2013 | |
| WO | WO-2013128452 A1 * | 9/2013 | ............. B33Y 10/00 |
| WO | WO 2014/144634 | 9/2014 | |
| WO | WO 2016/063282 | 4/2016 | |
| WO | WO 2016/125170 | 8/2016 | |
| WO | WO 2017/068590 | 4/2017 | |
| WO | WO 2017/134672 | 8/2017 | |
| WO | WO 2017/134673 | 8/2017 | |
| WO | WO 2017/134674 | 8/2017 | |
| WO | WO 2017/134676 | 8/2017 | |
| WO | WO 2017/187434 | 11/2017 | |

OTHER PUBLICATIONS

Khodabakhshi, Khosrow. Anionic polymarisation of caprolactam: an approach to optimising thr polymerisation condition to be used in the jetting process. Diss. Loughborough University, 2011. (Year: 2011).*
Translation dated Apr. 20, 2020 of Notification of Office Action dated Mar. 24, 2020 From the State Intellectual Property Office of the People's Republic of China Re. Application No. 201580069912.7. (11 Pages).
Interview Summary dated Jun. 30, 2020 from the US Patent and Trademark Office Re. U.S. Appl. No. 16/095,384. (3 pages).
Official Action dated Jun. 18, 2020 from the US Patent and Trademark Office Re. U.S. Appl. No. 16/075,652. (59 pages).
Restriction Official Action Dated Jun. 23, 2020 from the US Patent and Trademark Office Re. U.S. Appl. No. 16/075,159. (8 pages).
Notification of Office Action dated Mar. 24, 2020 From the State Intellectual Property Office of the People's Republic of China Re. Application No. 201580069912.7. (9 Pages).
Restriction Official Action dated Apr. 17, 2020 from the US Patent and Trademark Office Re. U.S. Appl. No. 16/095,384. (6 pages).

(56) References Cited

OTHER PUBLICATIONS

European Search Report and the European Search Opinion dated Jan. 30, 2020 From the European Patent Office Re. Application No. 19206004.4. (7 Pages).
Applicant-Initiated Interview Summary dated May 14, 2018 From the US Patent and Trademark Office Re. U.S. Appl. No. 15/520,458. (2 pages).
International Preliminary Report on Patentability dated May 4, 2017 From the International Bureau of WIPO Re. Application No. PCT/IL2015/051038. (7 Pages).
International Preliminary Report on Patentability dated Aug. 16, 2018 From the International Bureau of WIPO Re. Application No. PCT/IL2017/050136. (14 Pages).
International Preliminary Report on Patentability dated Aug. 16, 2018 From the International Bureau of WIPO Re. Application No. PCT/IL2017/050137. (8 Pages).
International Preliminary Report on Patentability dated Aug. 16, 2018 From the International Bureau of WIPO Re. Application No. PCT/IL2017/050138. (12 Pages).
International Preliminary Report on Patentability dated Aug. 16, 2018 From the International Bureau of WIPO Re. Application No. PCT/IL2017/050140. (10 Pages).
International Preliminary Report on Patentability dated Aug. 17, 2017 From the International Bureau of WIPO Re. Application No. PCT/IL2016/050135. (7 Pages).
International Search Report and the Written Opinion dated Apr. 3, 2017 From the International Searching Authority Re. Application No. PCT/IL2017/050141. (12 Pages).
International Search Report and the Written Opinion dated May 8, 2016 From the International Searching Authority Re. Application No. PCT/IL2016/050135.
International Search Report and the Written Opinion dated Apr. 10, 2017 From the International Searching Authority Re. Application No. PCT/IL20 U.S. Appl. No. 17/050,138. (12 Pages).
International Search Report and the Written Opinion dated May 18, 2017 From the International Searching Authority Re. Application No. PCT/IL2017/050140. (15 Pages).
International Search Report and the Written Opinion dated May 22, 2017 From the International Searching Authority Re. Application No. PCT/IL2017/050137. (12 Pages).
International Search Report and the Written Opinion dated Aug. 24, 2017 From the International Searching Authority Re. Application No. PCT/IL2017/050136. (22 Pages).
International Search Report and the Written Opinion dated Jan. 28, 2016 From the International Searching Authority Re. Application No. PCT/IL2015/051038.
International Search Report and the Written Opinion dated Jan. 29, 2017 From the International Searching Authority Re. Application No. PCT/IL2016/051142. (12 Pages).
Invitation to Pay Additional Fees, Communication Relating to the Results of the Partial International Search and the Provisional Opinion dated Jun. 26, 2017 From the International Searching Authority Re. Application No. PCT/IL2017/050136. (18 Pages).
Official Action dated Jul. 12, 2018 From the US Patent and Trademark Office Re. U.S. Appl. No. 15/520,458. (35 pages).
Restriction Official Action dated Feb. 13, 2018 From the US Patent and Trademark Office Re. U.S. Appl. No. 15/520,458. (9 pages).
Supplementary European Search Report and the European Search Opinion dated Sep. 20, 2018 From the European Patent Office Re. Application No. 16746248.0. (8 Pages).
Supplementary European Search Report and the European Search Opinion dated Jun. 21, 2018 From the European Patent Office Re. Application No. 15852577.4. (6 Pages).
Ben-Asuly et al. "Photoactivation of Ruthenium Olefin Metathesis Initiators", Organometallics, 28: 4652-4655, Published on Web Jul. 24, 2009.
Diesendruck et al. "A Latent S-Chelated Ruthenium Benzylidene Initiator for Ring-Opening Metathesis Polymerization", Journal of Polymer Science, Part A: Polymer Chemistry, 47(16): 4209-4213, Published Online Jul. 8, 2009.

Doubrovski et al. "Voxel-Based Fabrication Through Material Property Mapping: A Design Method for Bitmap Printing", Computer-Aided Design, 60: 3-13, Available Online Jun. 5, 2014. Abstract, p. 7, Para 3.2.3, p. 11-12, Para 5.2, Section 3 'Voxed-Based Design for 3D Printing', Section 4 'Implementation'.
Doubrovski et al. "Voxel-Based Fabrication Through Material Property Mapping: A Design Method for Bitmap Printing", Computer-Aided Design, XP029107146, 60(C): Mar. 3-13, 2015. p. 1-9.
Fleet et al. "Inkjet Printing of Self-Healing Polymers for Enhanced Composite Interlaminar Properties", Journal of Materials Chemistry A, 3(5): 2283-2293, Published Online Dec. 8, 2014.
Gong et al. "ROMP of Acetoxy-Substituted Dicyclopentadiene to Linear Polymer With a High Tg", RSC Advances, 5(33): 26185-26188, Mar. 20, 2015.
Harris et al. "Photolithographic Patterning of Ring-Opening Metathesis Catalysts on Silicon", Advanced Materials, 17(1): 39-42, Published Online Jan. 6, 2005.
Khodabakhshi et al. "Anionic Polymerisation of Caprolactam at the Small-Scale Via DSC Investigations: A Method to Be Used in an Additive Manufacturing Process", Journal of Thermal Analysis and Calorimetry, XP055377014, 115(1): 383-391, Published Online Aug. 8, 2013. p. 384, Para 1, Fig.1, Para 2.
Pastine et al. "Chemicals On Demand With Phototriggerable Microcapsules", Journal of the American Chemical Society, JACS, 131(38): 13586-13587, Sep. 30, 2009.
Piermattei et al. "Activating Catalysts With Mechanical Force", Nature Chemistry, 1(2): 133-137, Advanced Online Publication Apr. 6, 2009.
Saha et al. "Cross-Linked ROMP Polymers Based on Odourless Dicyclopentadiene Derivatives", Polymer Chemistry, 7(18): 3071-3075, Published Online Apr. 14, 2016.
Szadkowska et al. "Latent Thermo-Switchable Olefin Metathesis Initiators Bearing A Pyridyl-Functionalized Chelating Carbene: Influence of the Leaving Group's Rigidity on the Catalyst's Performance", Organometallics, 29: 117-124, Published on Web Dec. 14, 2009.
Vidavsky et al. "Light-Induced Olefin Metathesis", Beilstein Journal of Organic Chemistry, 6: 1106-1119, Nov. 23, 2010.
Wang et al. "Cationic RuII Complexes With N-Heterocyclic Carbene Ligands for UV-Induced Ring-Opening Metathesis Polymerization", Angewandte Chemie International Edition, 47(17): 3267-3270, Published Online Mar. 12, 2008.
Wilson et al. "Autonomic Healing of Epoxy Vinyl Esters Via Ring Opening Metathesis Polymerization", Advanced Functional Materials, 18(1): 44-52, 2008.
Official Action dated Sep. 30, 2019 From the US Patent and Trademark Office Re. U.S. Appl. No. 15/549,191. (46 pages).
Notification of Reasons for Rejection dated Jul. 2, 2019 From the Japan Patent Office Re. Application No. 2017-521539 and its Translation Into English. (7 Pages).
Supplementary European Search Report and the European Search Opinion dated Jun. 24, 2019 From the European Patent Office Re. Application No. 17747123.2. (6 Pages).
Notification of Reasons for Rejection dated Oct. 15, 2019 From the Japan Patent Office Re. Application No. 2017-521539 and its English Summary. (3 Pages).
Restriction Official Action dated Jun. 11, 2019 From the US Patent and Trademark Office Re. U.S. Appl. No. 15/549,191. (10 Pages).
Communication Pursuant to Article 94(3) EPC dated Feb. 22, 2019 From the European Patent Office Re. Application No. 15852577.4. (5 Pages).
Notification of Office Action dated Mar. 28, 2019 From the State Intellectual Property Office of the People's Republic of China Re. Application No. 201580069912.7. (11 Pages).
Official Action dated Jul. 17, 2020 from the US Patent and Trademark Office Re. U.S. Appl. No. 16/095,384. (49 pages).
Notification of Office Action and Search Report dated Aug. 20, 2020 From the State Intellectual Property Office of the People's Republic of China Re. Application No. 201780020827.0. (7 Pages).
Invitation Pursuant to Rule 137(4) EPC and Article 94(3) EPC dated Jun. 25, 2019 From the European Patent Office Re. Application No. 17706320.3. (2 Pages).

(56) References Cited

OTHER PUBLICATIONS

Notification of Office Action and Search Report dated Jul. 24, 2019 From the State Intellectual Property Office of the People's Republic of China Re. Application No. 201580069912.7. (13 Pages).
Translation of Notification dated Aug. 13, 2019 From OA of Jul. 24, 2019 From the State Intellectual Property Office of the People's Republic of China Re. Application No. 201580069912.7. (15 Pages).
Thomas et al. "Thermally Stable, Latent Olefin Metathesis Catalysts", Organometallics, 30(24): 6713-6717, Published Online Nov. 18, 2011.
Translation dated Apr. 16, 2019 of Notification of Office Action dated Mar. 28, 2019 From the State Intellectual Property Office of the People's Republic of China Re. Application No. 201580069912.7. (4 Pages).
International Preliminary Report on Patentability dated Nov. 8, 2018 From the International Bureau of WIPO Re. Application No. PCT/IL2017/050141. (7 Pages).
Notification of Office Action and Search Report dated Oct. 23, 2018 From the State Intellectual Property Office of the People's Republic of China Re. Application No. 201580069912.7 and its Summary of Office Action in English. (19 Pages).
Translation dated Sep. 18, 2020 of Notification of Office Action dated Aug. 20, 2020 From the State Intellectual Property Office of the People's Republic of China Re. Application No. 201780020827.0. (6 Pages).
Office Action dated Dec. 15, 2019 From the Israel Patent Office Re. Application No. 253826 and its Translation Into English. (5 Pages).
Invitation Pursuant to Rule 137(4) EPC and Article 94(3) EPC dated Jun. 25, 2019 From the European Patent Office Re. Application No. 17709812.6. (2 Pages).
Final Official Action dated Jun. 9, 2020 from the US Patent and Trademark Office Re. U.S. Appl. No. 15/549,191. (29 pages).
Office Action dated Jun. 3, 2020 From the Israel Patent Office Re. Application No. 251842 and its Translation Into English. (5 Pages).
Notification of Reasons for Rejection dated Oct. 15, 2019 From the Japan Patent Office Re. Application No. 2017-521539. (2 Pages).
Notice ofReason(s) for Rejection dated May 21, 2021 Mar. 2016 From the Japan Patent Office Re. Application No. 2018-541164 and Its Translation Into English.
Notice of Reason for Rejection dated Feb. 12, 2021 From the Japan Patent Office Re. Application No. 2018-541164 and Its Translation Into English. (8 Pages).
Notice of Reason(s) for Rejection dated Aug. 27, 2021 From the Japan Patent Office Re. Application No. 2018-541164 and Its Translation Into English.(6 Pages).
Translation dated Jul. 21, 2021 of Notification of Office Action dated Jun. 29, 2021 From the State Intellectual Property Office of the People's Republic of China Re. Application No. 201780020827.0. (13 Pages).

* cited by examiner

THREE-DIMENSIONAL INKJET PRINTING USING POLYAMIDE-FORMING MATERIALS

RELATED APPLICATIONS

This application is a National Phase of PCT Patent Application No. PCT/IL2017/050136 having International filing date of Feb. 5, 2017, which claims the benefit of priority under 35 USC § 119(e) of U.S. Provisional Patent Application No. 62/291,629 filed on Feb. 5, 2016. The contents of the above applications are all incorporated by reference as if fully set forth herein in their entirety.

FIELD AND BACKGROUND OF THE INVENTION

The present invention, in some embodiments thereof, relates to three-dimensional inkjet printing and, more particularly, but not exclusively, to formulation systems usable in three-dimensional inkjet printing of polyamide materials, to methods of three-dimensional inkjet printing of objects comprising polyamide materials and to three-dimensional objects obtained by these methods.

Three-dimensional (3D) inkjet printing is a known process for building three dimensional objects by selectively jetting chemical compositions, for example, polymerizable compositions, via ink-jet printing head nozzles onto a printing tray in consecutive layers, according to pre-determined image data. 3D inkjet printing is performed by a layer by layer inkjet deposition of chemical formulations, which form together a building material formulation. Thus, a chemical formulation is dispensed in droplets from a dispensing head having a set of nozzles to form layers on a receiving medium. The layers may then be cured or solidified using a suitable methodology, to form solidified or partially solidified layers of the building material.

The chemical formulations used for forming the building material may be initially liquid and subsequently hardened (cured or solidified) to form the required layer shape. The hardening may be effected, for example, by exposing the building material to a curing energy such as thermal energy (e.g., by heating the building material) or to irradiation (e.g., UV or other photo-irradiation), or may be activated chemically, for example, by acid or base activation.

The chemical (e.g., polymerizable) formulations utilized in inkjet 3D printing processes are therefore selected so as to meet the process requirements, namely, exhibiting a suitable viscosity during jetting (thus being non-curable under jetting conditions) and rapid curing or solidification, typically upon exposure to a stimulus, on the receiving medium.

Various three-dimensional printing techniques exist and are disclosed in, e.g., U.S. Pat. Nos. 6,259,962, 6,569,373, 6,658,314, 6,850,334, 7,183,335, 7,209,797, 7,225,045, 7,300,619, 7,479,510, 7,500,846, 7,962,237 and 9,031,680, all of the same Assignee, the contents of which are hereby incorporated by reference.

A printing system utilized in a 3D inkjet printing process may include a receiving medium and one or more printing heads. The receiving medium can be, for example, a fabrication tray that may include a horizontal surface to carry the material dispensed from the printing head. The printing head(s) may be, for example, an ink jet head having a plurality of dispensing nozzles arranged in an array of one or more rows along the longitudinal axis of the printing head. The jetting nozzles dispense material onto the receiving medium to create the layers representing cross sections of a 3D object.

In addition, there may be a source of curing energy, for curing the dispensed building material.

Additionally, the printing system may include a leveling device for leveling and/or establishing the height of each layer after deposition and at least partial solidification, prior to the deposition of a subsequent layer.

The building materials may include modeling materials and support materials, which form the object and optionally the temporary support constructions supporting the object as it is being built, respectively. The modeling material (which may include one or more material(s)) is deposited to produce the desired object/s and the support material (which may include one or more material(s)) is used, with or without modeling material elements, to provide support structures for specific areas of the object during building and assure adequate vertical placement of subsequent object layers, e.g., in cases where objects include overhanging features or shapes such as curved geometries, negative angles, voids, and so on.

Both the modeling and support materials are preferably liquid at the working temperature at which they are dispensed, and subsequently hardened, upon exposure to a condition that affects curing of the materials, to form the required layer shape. After printing completion, support structures, if present, are removed to reveal the final shape of the fabricated 3D object.

In order to be compatible with most of the commercially-available printing heads utilized in a 3D inkjet printing system, the uncured building material should feature the following characteristics: a relatively low viscosity (e.g., Brookfield Viscosity of up to 35 cps, preferably from 8 to 25 cps) at the working (e.g., jetting) temperature; Surface tension of from about 10 to about 50 Dyne/cm; and a Newtonian liquid behavior and high reactivity to a selected curing energy, to enable immediate solidification of the jetted layer upon exposure to a curing energy).

The cured modeling material which forms the final object should preferably exhibit heat deflection temperature (HDT) which is higher than room temperature, in order to assure its usability. Typically, the cured modeling material should exhibit HDT of at least 35° C. For an object to be stable at variable conditions, a higher HDT is desirable. In most cases, it is also desirable that the object exhibits relatively high Izod Notched impact, e.g., higher than 50 or higher than 60 J/m.

Until today, most 3D inkjet methodologies have utilized photopolymerizable materials, and photo-induced curing, typically UV curing, thus narrowing the choice of materials and chemical reactions that can be utilized in this technology. Exemplary photopolymerizable building materials that are currently used in, for example, a "PolyJet" technology (Stratasys Ltd., Israel), are acrylic based materials.

International PCT Patent Application Publication No. WO 2013/128452, by the present Assignee, discloses a multi-material approach which involves separate jetting of two components of a cationic polymerizable system and/or a radical polymerizable system, which intermix on the printing tray, leading to a polymerization reaction similar to pre-mixing of the two components before jetting, while preventing their early polymerization on the inkjet head nozzle plate.

Building materials obtained by Ring Opening Polymerization (ROP) reactions such as anionic and cationic ring opening polymerizations, exhibit certain valuable properties, such as potentially high curing speed, relatively low shrinkage, high thermal resistance and chemical and solvent resistance. These reactions often provide thermoplastic and/or thermosetting materials, which may find many applications upon being engineered by inkjet 3D printing.

Commercially available Nylon6 is known as a thermoplastic polymer which exhibits HDT higher than 150° C., and moderate impact resistance of about 30-60 J/m.

Nylon6 can be produced by thermally induced ring-opening polymerization of ε-Caprolactam monomer, which can undergo several pathways:

Self-polycondensation (typically by heating at a temperature of 260° C. for a few hours); cationic polycondensation (typically in an acidic aqueous solution, by heating at a temperature of 250° C. for a few hours); and anionic polymerization (typically by heating at 130-160° C., for up to 30 minutes).

An anionic ring opening polymerization of caprolactam is considered the most industrially applicable methodology for production Nylon6. This reaction takes place in the presence of a catalyst, typically a strong base or a product of a reaction of a strong base and caprolactam, and a promoter (also referred to herein and in the art as activator), under inert atmosphere. For example, one of the typical activators in anionic ROP of ε-Caprolactam is N-acylcaprolactam.

Scheme 1 below presents an exemplary synthetic pathway of the polymerization of caprolactam via anionic ROP, using N-acylcaprolactam as a promoter.

In step (i), initiation of the reaction is effected by reacting caprolactam with a strong base. This step can be performed in situ, such that the base (e.g., sodium) serves as catalyst, or that sodium caprolactam is added as the catalyst. Commonly used catalysts include sodium caprolactam and caprolactam MgBr (magnesium bromide caprolactam).

In step (ii), the anionic caprolactam reacts with the exemplified N-acyl caprolactam to form an intermediate anion, whereby the activator forms a part of this intermediate anion. The polymerization then proceeds by step-by-step linking of amide units to the intermediate anion.

As seen in Scheme 1, the activator serves as a base unit to which amide moieties are added to form the final polymer, and hence forms a part of the final polymeric material.

Over the years, numerous compounds have been used as activators for the anionic polymerization of lactams, including, for example, acyl lactams, such as disclosed in EP Patent No. 1449865, oxazolines such as disclosed in EP Patent No. 0786482, ethylenebisamides such as disclosed in U.S. Patent Application Publication No. 2010/0113661, isocyanates, and masked (capped, e.g., caprolactam-blocked isocyanate compounds, such as, for example, hexamethylene diisocyanate (HDI). Other liquid activator systems for anionic lactam polymerization are known in which isocyanate compounds are mixed with pyrrolidone compounds, e.g. N-methyl pyrrolidone or N-ethyl pyrrolidone, as described, for example, in EP Patent No. 0167907. EP Patent Application Nos. 0134616 and 0135233 disclose N-substi- Scheme 1

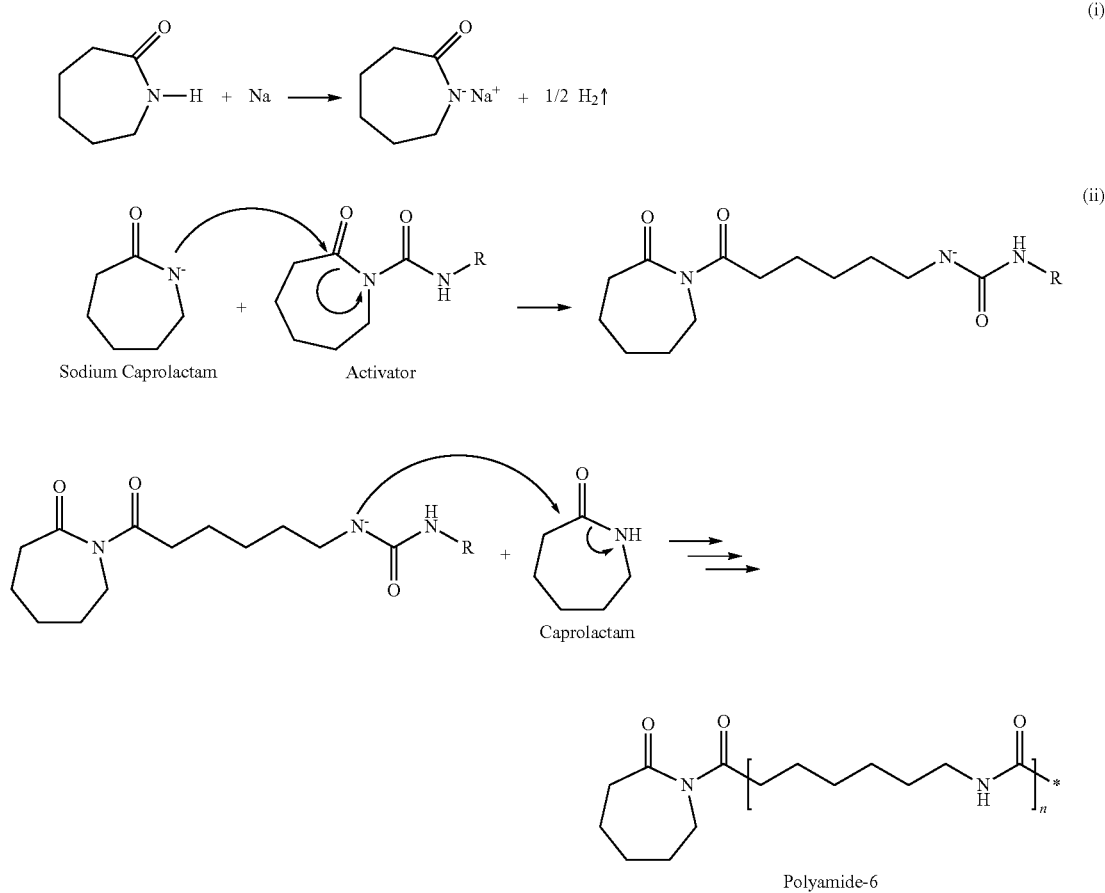

tuted carbamoyl-lactam compounds suitable as promoters or activators for anionic polymerization of lactams.

Nylon6, as well as other polyamides, can be prepared by anionic polymerization, by known casting processes such as vertical casting, centrifugal casting or rotocasting. Some industrial production processes of Nylon6 involve mixing two components—molten pre-blends of caprolactam/activator and caprolactam/catalyst, and filling a mold, whereby the polymerization reaction is completed within a few minutes in the mold.

The moderate impact resistance of Nylon6 and other polyamides can be improved by using impact modifiers, the most commonly practiced being PEG/PPG-based materials. Additional polyamide impact modifiers include polyols, such as polyetheramine (polyoxyalkylene triamine), commercially available under the trade names Jeffamine® (Huntsman), Polyetheramin (BASF) or PC Amine® (Nitroil), Jeffamine® T-403, Jeffamine® T-3000, Jeffamine® T-5000, Polyetheramine T403, Polyetheramine T5000, PC Amine® TA 403, PC Amine® TA 5000.

The choice of the activator and optionally the impact modifier provides for a control of the mechanical properties of the polyamide obtained by anionic ROP.

NYRIM®, for example, is an elastomer-modified nylon-6, or PA6 block copolymer polymerized by Bruggolen C1 catalyst (caprolactam magnesium bromide). The characteristics of this copolymer can be selectively controlled, depending on its intended use, by varying the elastomer content. Typically, the elastomer component accounts for between 10% (NYRIM® 1000) and 40% by weight (NYRIM® 4000) of the final product.

Some mechanical properties of NYRIM® compositions are presented in Table 1 below.

Several studies have been conducted for finding caprolactam compositions which can be used in inkjet printing processes. In most of these studies, two compositions, one of caprolactam and a catalyst (typically NaH or MgBr or corresponding lactam salts) and one of caprolactam and an activator (typically N-acetylcaprolactam), have been used. See, for example, Khosrow Khodabakhshi, A Doctoral Thesis. Submitted for the award of Doctor of Philosophy of Loughborough University, 2011; Khodabakhshi et al., Solid Freeform Fabrication Proceedings, The University of Texas at Austin, Tex. (USA), 2009; Fathi et al., NIP25: International Conference on Digital Printing Technologies and Digital Fabrication, Louisville, Ky., September 2009, 784-787; Fathi and Dickens, J. Manuf. Sci. Eng. 134(4), 041008 (Jul. 18, 2012).

Additional background art includes GB2382798 and WO 2016/050135.

SUMMARY OF THE INVENTION

The present inventors have devised and successfully practiced a methodology for inkjet printing of objects made of polyamide materials (e.g., objects comprising polymerized polyamide precursors such as lactams), while controlling the properties of the objects. These methodologies can be performed while utilizing a multi-part (e.g., two-part) formulation system, by dual jetting of one formulation that comprises curable (polymerizable) lactam monomer or any other polyamide precursor and another formulation that comprises a promoter (activator) of an anionic ring opening polymerization of the lactam, and subjecting the jetted formulations to conditions that effect anionic ring opening polymerization (anionic ROP) of the lactam (or any other polyamide precursor).

TABLE 1

| Parameter | NYRIM® 1000 | NYRIM® 2000 | NYRIM® 3000 | NYRIM® 4000 |
| --- | --- | --- | --- | --- |
| Modulus of elasticity (tensile test) [MPa] | 2500 | 1700 | 978 | 300 |
| Elongation at fracture [%] | 40 | 270 | 350 | 420 |
| Tensile strength [MPa] | 58 | 47 | 37 | 26 |
| Impact resistance (Izod) at 23° C. [kJ/m$^2$] | 10 | 30 | 62 | No fracture |
| Impact resistance (Izod) at −40° C. [kJ/m$^2$] | 7 | 9 | 16 | No fracture |
| Hardness (Shore D) | 79 | 74 | 67 | 59 |

Additional modifications of anionic polymerization of polyamides, made in order to control the properties of the obtained polymer have been described in the art.

U.S. Patent Application Publication No. 2013/0065466 describes anionic polymerization of polyamides in the presence of polyethyleneimines.

U.S. Pat. No. 9,139,752 describes a process for producing polyamides via anionic polymerization using capped (lactam-blocked) polyisocyanate as an activator (promoter).

U.S. Patent Application Publication No. 2012/0283406 describes compositions comprising an aliphatic or alicyclic di- or multi-isocyanate compound and a lactone, utilized in anionic polymerization of lactam, for controlling the mechanical properties of the obtained polyamide.

EP Patent Application No. 2801588 describes compositions containing N-acetylcaprolactam and (optionally caprolactam-blocked) polyisocyanate compounds based on hexamethylene diisocyanate (HDI), usable in production of polyamide castings.

Utilizing ring opening polymerization reactions in 3D inkjet printing methodologies can open the way to new and versatile materials for forming three-dimensional printed objects.

The present inventors have devised formulation systems, and printing methods utilizing same, that meet the process requirements of three-dimensional inkjet printing, both in terms of the properties of the uncured formulations (system compatibility), in terms of the curing time and in terms of the mechanical properties of the formed object.

According to an aspect of some embodiments of the present invention there is provided a method of fabricating an object which comprises at least one polyamide material, the method comprising:

receiving three-dimensional printing data corresponding to the shape of the object;

dispensing droplets of at least a first model formulation and a second model formulation in layers, on a receiving medium, using at least two different inkjet printing heads, according to the printing data; and exposing the layers to a curing energy, the curing energy comprising heat, wherein the first model formulation comprises a lactam and a catalyst for inducing anionic ring opening polymerization of the lactam, and the second model formulation comprises an activator for promoting the anionic ring opening polymerization of the lactam, and wherein at least one of the first and second model formulations further comprises a compound capable of increasing a rate of the polymerization upon exposure to the curing energy, thereby fabricating the object.

According to some of any of the embodiments described herein, the first model formulation further comprises the compound capable of increasing a rate of the polymerization upon exposure to the curing energy.

According to some of any of the embodiments described herein, the compound capable of increasing a rate of the polymerization upon exposure to the curing energy is an amine-containing compound.

According to some of any of the embodiments described herein, the compound capable of increasing a rate of the polymerization upon exposure to the curing energy is an aliphatic or alicyclic, monomeric, oligomeric or polymeric compound featuring at least one primary, secondary and/or tertiary amine group(s).

According to some of any of the embodiments described herein, the amine-containing compound is selected from the group consisting of an aliphatic or alicyclic monomeric compound featuring at least one amine group, a polyether amine, and a polyalkylene imine.

According to some of any of the embodiments described herein, the polyalkylene imine is a hyperbranched polyalkylene imine.

According to some of any of the embodiments described herein, the amine-containing compound is selected from the group consisting of isophorone diamine, triethylenetetramine, Jeffamine® T-403, Jeffamine® T-3000, Jeffamine® T-5000, Polyetheramine T403, Polyetheramine T5000, PC Amine® TA 403, PC Amine® TA 5000, Epomin® SP-003, Epomin® SP-006, Lupasol® FG, Lupasol® PR8515, and Lupasol® WF.

According to some of any of the embodiments described herein, the activator is or comprises an isocyanate material.

According to some of any of the embodiments described herein, the isocyanate material is or comprises a non-blocked polyisocyanate.

According to some of any of the embodiments described herein, the method further comprises selecting a ratio A:B of the first model formulation and the second model formulation, wherein A represents the part by weight of the first model formulation and B represents a part by weight of the second formulation; and dispensing the droplets in accordance with the ratio, wherein the ratio ranges from about 1.5:1 to about 5:1.

According to some of any of the embodiments described herein, the ratio is about 4:1.

According to some of any of the embodiments described herein, the compound which increases the polymerization rate is selected from an aliphatic or alicyclic monomer compound featuring at least one amine group and a polyether amine.

According to some of any of the embodiments described herein, the compound which increases the polymerization rate is a multifunctional polyether amine.

According to some of any of the embodiments described herein, the multifunctional polyether amine has a molecular weight of at least 1000 grams/mol.

According to some of any of the embodiments described herein, the activator is or comprises a non-blocked polyisocyanate; and the compound which increases the polymerization rate is a multifunctional polyether amine having a molecular weight of at least 1000 grams/mol, and wherein the method further comprises selecting a ratio A:B of the first model formulation and the second model formulation, wherein A represents the part by weight of the first model formulation and B represents a part by weight of the second formulation; and dispensing the droplets in accordance with the ratio, wherein the ratio is about 4:1.

According to some of any of the embodiments described herein, a concentration of the compound which increases the polymerization rate ranges from 1 to 10, or from 2 to 8, or from 3 to 7, or is 5, weight percents of the total weight of the first model formulation.

According to some of any of the embodiments described herein, the isocyanate material is or comprises a lactam-blocked isocyanate material.

According to some of any of the embodiments described herein, the isocyanate material is or comprises a caprolactam-blocked isocyanate material, preferably a ε-caprolactam-blocked isocyanate material.

According to some of any of the embodiments described herein, the isocyanate material is or comprises a diisocyanate, preferably, a hexamethylene diisocynate.

According to some of any of the embodiments described herein, the compound which increases the polymerization rate is a polyalkylene imine, preferably a hyperbranched polyethylene imine.

According to some of any of the embodiments described herein, the polyalkylene imine has a molecular weight lower than 5000 grams/mol.

According to some of any of the embodiments described herein, the activator is or comprises a caprolactam-blocked diisocyanate; and the compound which increases the polymerization rate is or comprises a hyperbranched polyalkylene imine having a molecular weight lower than 5000 grams/mol.

According to some of any of the embodiments described herein, a concentration of the compound which increases the polymerization rate ranges from 1 to 10, or from 2 to 8, or from 3 to 7, or is 5, weight percents of the total weight of the first model formulation.

According to some of any of the embodiments described herein, the isocyanate material is or comprises a lactam-blocked polyisocyanate.

According to some of any of the embodiments described herein, the isocyanate material is or comprises a caprolactam-blocked polyisocyanate material, preferably a ε-caprolactam-blocked polyisocyanate material.

According to some of any of the embodiments described herein, the polyisocyanate material is or comprises an isocyanurate trimer of a diisocyanate, preferably, an isocyanurate trimer of hexamethylene diisocynate.

According to some of any of the embodiments described herein, the compound which increases the polymerization rate is a polyalkylene imine, preferably a hyperbranched polyethylene imine.

According to some of any of the embodiments described herein, the polyalkylene imine has a molecular weight lower than 5000 grams/mol.

According to some of any of the embodiments described herein, the activator is or comprises a caprolactam-blocked diisocyanate; and the compound which increases the polymerization rate is or comprises a hyperbranched polyalkylene imine having a molecular weight lower than 5000 grams/mol.

According to some of any of the embodiments described herein, a concentration of the compound which increases the polymerization rate ranges from 1 to 10, or from 1 to 5, or from 2 to 3, or is 2.5, weight percents of the total weight of the first model formulation.

According to an aspect of some embodiments of the present invention there is provided a method of fabricating an object which comprises at least one polyamide material, the method comprising:

receiving three-dimensional printing data corresponding to the shape of the object;

dispensing droplets of at least a first model formulation and a second model formulation in layers, on a receiving medium, using at least two different inkjet printing heads, according to the printing data; and exposing the layers to a curing energy, the curing energy comprising heat, wherein the first model formulation comprises a lactam and a catalyst for inducing anionic ring opening polymerization of the lactam, and the second model formulation comprises an activator for promoting the anionic ring opening polymerization of the lactam, wherein the activator comprises a lactam-blocked polyisocyanate, thereby fabricating the object.

According to some of any of the embodiments described herein, at least one of the first and second model formulations further comprises a compound capable of increasing a rate of the polymerization upon exposure to the curing energy.

According to some of any of the embodiments described herein, the first model formulation further comprises the compound capable of increasing a rate of the polymerization upon exposure to the curing energy.

According to some of any of the embodiments described herein, the compound capable of increasing a rate of the polymerization upon exposure to the curing energy is or comprises a polyalkylene imine, preferably a hyperbranched polyethylene imine.

According to some of any of the embodiments described herein, the polyalkylene imine has a molecular weight lower than 5000 grams/mol.

According to some of any of the embodiments described herein, the lactam-blocked polyisocyanate is a caprolactam-blocked polyisocyanate, preferably a ε-caprolactam-blocked polyisocyanate material.

According to some of any of the embodiments described herein, the polyisocyanate is an isocyanurate trimer of a diisocyanate, preferably, an isocyanurate trimer of hexamethylene diisocynate.

According to an aspect of some embodiments of the present invention there is provided a method of fabricating an object which comprises at least one polyamide material, the method comprising:

receiving three-dimensional printing data corresponding to the shape of the object;

dispensing droplets of at least a first model formulation and a second model formulation in layers, on a receiving medium, using at least two different inkjet printing heads, according to the printing data; and exposing the layers to a curing energy, the curing energy comprising heat, wherein the first model formulation comprises a lactam and a catalyst for inducing anionic ring opening polymerization of the lactam, and the second model formulation comprises an activator for promoting the anionic ring opening polymerization of the lactam, wherein the activator is or comprises an isocyanate material, and wherein at least one of the first and second model formulations further comprises a compound capable of increasing a rate of the polymerization upon exposure to the curing energy, thereby fabricating the object.

According to some of any of the embodiments described herein, the first model formulation further comprises the compound capable of increasing a rate of the polymerization.

According to some of any of the embodiments described herein, the compound capable of increasing a rate of the polymerization upon exposure to the curing energy is or comprises a polyalkylene imine, preferably a hyperbranched polyethylene imine.

According to some of any of the embodiments described herein, the polyalkylene imine has a molecular weight lower than 5000 grams/mol.

According to an aspect of some embodiments of the present invention there is provided a method of fabricating an object which comprises at least one polyamide material, the method comprising:

receiving three-dimensional printing data corresponding to the shape of the object;

selecting a ratio A:B of a first model formulation and a second model formulation, wherein A represents the part by weight of the first model formulation and B represents a part by weight of the second formulation;

dispensing droplets of at least the first model formulation and the second model formulation in layers, on a receiving medium, using at least two different inkjet printing heads, according to the printing data and the ratio; and exposing the layers to a curing energy, the curing energy comprising heat, wherein the first model formulation comprises a lactam and a catalyst for inducing anionic ring opening polymerization of the lactam, and the second model formulation comprises an activator for promoting the anionic ring opening polymerization of the lactam, the activator being or comprising a non-blocked polyisocyanate, wherein the A:B ratio ranges from about 1.5:1 to about 5:1, thereby fabricating the object.

According to some of any of the embodiments described herein, the A:B ratio is about 4:1.

According to some of any of the embodiments described herein, the first model formulation further comprises a compound capable of increasing a rate of the polymerization upon exposure to the curing energy.

According to some of any of the embodiments described herein, the compound is an amine-containing compound.

According to some of any of the embodiments described herein, the compound is selected from an aliphatic or alicyclic monomer compound featuring at least one amine group and a polyetheramine.

According to some of any of the embodiments described herein, the compound is a multifunctional polyether amine.

According to some of any of the embodiments described herein, the multifunctional polyether amine has a molecular weight of at least 1000 grams/mol.

According to some of any of the embodiments described herein, the first model formulation further comprises at least one material selected for reducing a melting point of the formulation.

According to some of any of the embodiments described herein, the lactam is a caprolactam.

According to some of any of the embodiments described herein, the lactam is ε-caprolactam.

According to some of any of the embodiments described herein, the catalyst is a caprolactamate salt or is capable of generating the caprolactamate salt.

According to some of any of the embodiments described herein, the first model formulation is such that features a melting point lower than 68° C., or lower than 65° C., or lower than 62° C., or lower than 60° C.

According to an aspect of some embodiments of the present invention there is provided a method of fabricating an object which comprises at least one polyamide material, the method comprising:

receiving three-dimensional printing data corresponding to the shape of the object;

dispensing droplets of at least a first model formulation and a second model formulation in layers, on a receiving medium, using at least two different inkjet printing heads, according to the printing data; and exposing the layers to a curing energy, the curing energy comprising heat, wherein the first model formulation comprises a lactam and a catalyst for inducing anionic ring opening polymerization of the lactam, and the second model formulation comprises an activator for promoting the anionic ring opening polymerization of the lactam, wherein the first model formulation further comprises at least one material capable of reducing a melting point of the first model formulation, thereby fabricating the object.

According to some of any of the embodiments described herein, the lactam is a caprolactam.

According to some of any of the embodiments described herein, the lactam is ε-caprolactam.

According to some of any of the embodiments described herein, the catalyst is a caprolactamate salt or is capable of generating the caprolactamate salt.

According to some of any of the embodiments described herein, the first model formulation is such that features a melting point lower than 68° C., or lower than 65° C., or lower than 62° C., or lower than 60° C.

According to some of any of the embodiments described herein, at least one of the first and second model formulations further comprises a compound capable of increasing a rate of the polymerization upon exposure to the cuing energy.

According to some of any of the embodiments described herein, the activator is or comprises an isocyanate material.

According to some of any of the embodiments described herein, the method further comprises, subsequent to the exposing to the curing energy, heating the object.

According to some of any of the embodiments described herein, the heating is for a time period ranging from 10 minutes to 3 hours.

According to some of any of the embodiments described herein, the heating is performed at a temperature of at least 100° C.

According to some of any of the embodiments described herein, the method further comprises selecting a ratio A:B of a first model formulation and a second model formulation, wherein A represents the part by weight of the first model formulation and B represents a part by weight of the second formulation, wherein the A:B ratio ranges from about 9:1 to about 1:9, wherein dispensing the droplets is in accordance with the ratio.

According to some of any of the embodiments described herein, the method further comprises selecting a ratio of the first model formulation and the second model formulation, wherein for at least one region of the object, the dispensing of the droplets is selected to form voxel blocks, wherein, for each block, a ratio between a number of voxels of the first composition in the block and a number of voxels of the second composition in the block corresponds to the selected ratio.

According to some of any of the embodiments described herein, each of the voxel blocks comprises from 2 to 20 voxels.

According to some of any of the embodiments described herein, selecting the ratio is performed for at least two different layers.

According to some of any of the embodiments described herein, selecting the ratio is executed at least twice for at least one of the layers.

According to some of any of the embodiments described herein, the dispensing the droplets comprises dispensing a droplet of the first model formulation and a droplet of the second model formulation one on top of the other.

According to some of any of the embodiments described herein, the method further comprises heating at least one of the first and second compositions prior to the dispensing.

According to some of any of the embodiments described herein, the heating is at a temperature at which each of the first model formulation and the second model formulation exhibits a viscosity of no more than 25 centipoises, the temperature being lower than a temperature at which the anionic ring opening polymerization occurs.

According to some of any of the embodiments described herein, exposing the dispensed layers to the curing energy comprises heating the receiving medium using a resistive heater.

According to some of any of the embodiments described herein, exposing the dispensed layers to the curing energy comprises irradiating the dispensed layers by heat-inducing radiation.

According to some of any of the embodiments described herein, the dispensing and/or exposing to the curing energy is effected under a generally dry and inert environment.

According to an aspect of some embodiments of the present invention there is provided a two-part formulation system suitable for three-dimensional inkjet printing of an object comprising a polyamide material, the formulation system comprising:

a first formulation comprising a lactam and a catalyst for inducing anionic ring opening polymerization of the lactam; and a second formulation comprising an activator for promoting the polymerization, the activator being or comprising a lactam-blocked polyisocyanate.

According to some of any of the embodiments described herein, at least one of the first and second model formulations further comprises a compound capable of increasing a rate of the polymerization upon exposure to curing energy.

According to some of any of the embodiments described herein, the first model formulation further comprises the compound capable of increasing a rate of the polymerization upon exposure to curing energy.

According to some of any of the embodiments described herein, a concentration of the compound in the first formulation ranges from 1 to 10, or from 1 to 5, weight percents of the total weight of the first formulation.

According to some of any of the embodiments described herein, the compound capable of increasing a rate of the polymerization upon exposure to the curing energy is or comprises a polyalkylene imine, preferably a hyperbranched polyethylene imine.

According to some of any of the embodiments described herein, the polyalkylene imine has a molecular weight lower than 5000 grams/mol.

According to some of any of the embodiments described herein, the lactam-blocked polyisocyanate is a caprolactam-blocked polyisocyanate, preferably a ε-caprolactam-blocked polyisocyanate material.

According to some of any of the embodiments described herein, the polyisocyanate is an isocyanurate trimer of a diisocyanate, preferably, an isocyanurate trimer of hexamethylene diisocynate.

According to some of any of the embodiments described herein, a weight ratio of the first and second model formulations ranges from 9:1 to 1:9, respectively.

According to some of any of the embodiments described herein, the weight ratio is 1:1.

According to an aspect of some embodiments of the present invention there is provided a two-part formulation system suitable for three-dimensional inkjet printing of an object comprising a polyamide material, the formulation system comprising:

a first formulation comprising a lactam and a catalyst for inducing anionic ring opening polymerization of the lactam; and a second formulation comprising an activator for promoting the polymerization, wherein the activator is or comprises a an isocyanate material, and wherein at least one of the first and second model formulations further comprises a compound capable of increasing a rate of the polymerization upon exposure to curing energy.

According to some of any of the embodiments described herein, the first model formulation further comprises the compound capable of increasing a rate of the polymerization.

According to some of any of the embodiments described herein, the compound capable of increasing a rate of the polymerization upon exposure to the curing energy is or comprises a polyalkylene imine, preferably a hyperbranched polyethylene imine.

According to some of any of the embodiments described herein, the polyalkylene imine has a molecular weight lower than 5000 grams/mol.

According to some of any of the embodiments described herein, a weight ratio of the first and second model formulations ranges from 9:1 to 1:9, respectively.

According to some of any of the embodiments described herein, the weight ratio is 1:1.

According to an aspect of some embodiments of the present invention there is provided a two-part formulation system suitable for three-dimensional inkjet printing of an object comprising a polyamide material, the formulation system comprising:

a first formulation comprising a lactam and a catalyst for inducing anionic ring opening polymerization of the lactam; and a second formulation comprising an activator for promoting the polymerization, the activator being or comprising a non-blocked polyisocyanate, wherein a weight ratio of the first and second model formulations ranges from 1.5:1 to 5:1, respectively.

According to some of any of the embodiments described herein, the weight ratio is about 4:1.

According to some of any of the embodiments described herein, the first model formulation further comprises a compound capable of increasing a rate of the polymerization upon exposure to the curing energy.

According to some of any of the embodiments described herein, the compound is an amine-containing compound.

According to some of any of the embodiments described herein, the compound is selected from an aliphatic or alicyclic monomer compound featuring at least one amine group and a polyetheramine.

According to some of any of the embodiments described herein, the compound is a multifunctional polyether amine.

According to some of any of the embodiments described herein, the multifunctional polyether amine has a molecular weight of at least 1000 grams/mol.

According to some of any of the embodiments described herein, the first model formulation further comprises at least one material selected for reducing a melting point of the formulation.

According to some of any of the embodiments described herein, the lactam is a caprolactam.

According to some of any of the embodiments described herein, the lactam is ε-caprolactam.

According to some of any of the embodiments described herein, the catalyst is a caprolactamate salt or is capable of generating the caprolactamate salt.

According to some of any of the embodiments described herein, the first model formulation is such that features a melting point lower than 68° C., or lower than 65° C., or lower than 62° C., or lower than 60° C.

According to an aspect of some embodiments of the present invention, there is provided a kit comprising a two-part formulation system as described herein in any one of the respective embodiments and any combination thereof. According to some embodiments, the first and second formulations forming the system are individually packaged within the kit. According to some embodiments, the kit is usable for manufacturing an object comprising a polyamide material. According to some embodiments, the kit is usable in a three-dimensional inkjet printing of an object comprising a polyamide material.

According to an aspect of some embodiments of the present invention there is provided a three-dimensional object comprising in at least a portion thereof a polyamide material, the portion being characterized by at least one of:

HDT of at least 140° C.; and

Izod notched Impact of at least 60 J/m.

According to an aspect of some embodiments of the present invention there is provided a three-dimensional object comprising in at least a portion thereof a polyamide material, fabricated by the method as described herein, in any of the respective embodiments.

According to some of any of the embodiments described herein, the portion of the object is characterized by at least one of:

HDT of at least 140° C.; and

Izod notched Impact of at least 60 J/m.

According to some of any of the embodiments described herein, the portion is characterized by HDT of at least 150° C.

According to some of any of the embodiments described herein, the portion is characterized by Izod notched Impact of at least 100 J/m.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL
VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 5A:
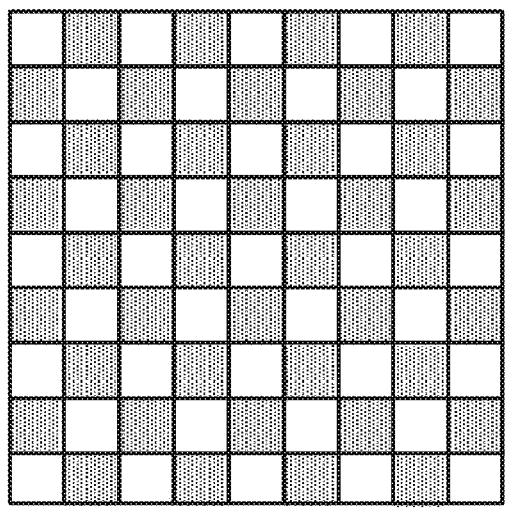
Figure 5B:
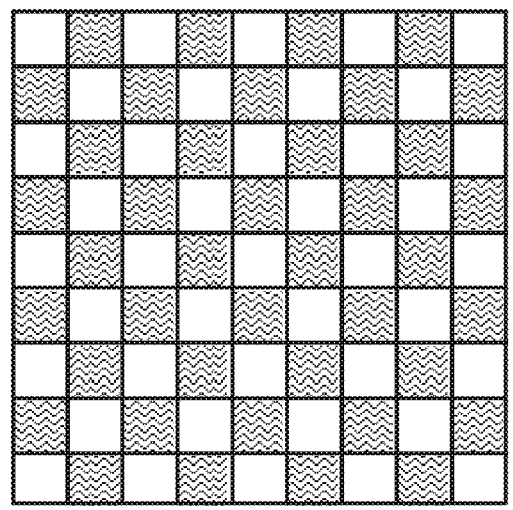

FIGS. 5A and 5B present schematic illustrations of bitmaps in embodiments of the invention in which a "Drop on Drop" printing protocol is employed. A bitmap suitable for the deposition of the catalyst-containing (e.g. Model A) formulation is illustrated in FIG. 5A and a bitmap suitable for the deposition of the activator-containing (e.g., Model B) formulation is illustrated in FIG. 5B. When the droplets of both formulations have the same or approximately the same weight, the bitmaps are useful for a 50:50 w/w ratio. White boxes represent vacant locations, dotted boxes represent droplets of catalyst-containing formulation and wavy boxes represent droplets of activator-containing formulation. Each patterned (wavy/dotted) box represents a pixel (e.g., one formulation droplet) in a layer. Both formulations can be deposited at the same location, but different times, during movement of the printing head.

Figure 6A:
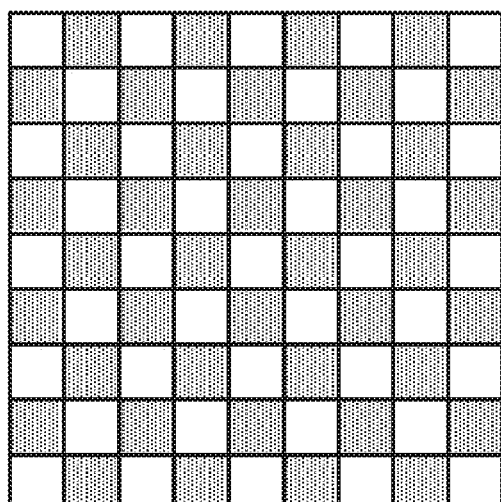
Figure 6B:
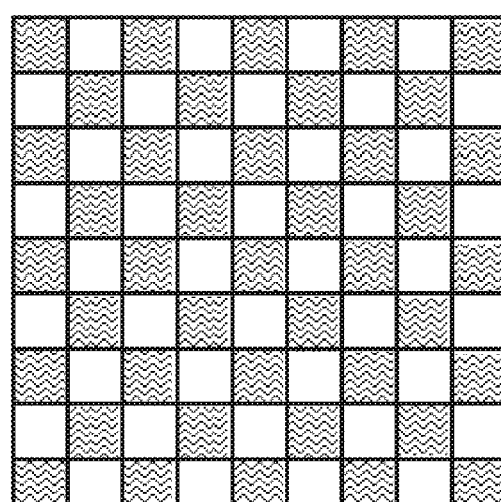

FIGS. 6A and 6B present schematic illustrations of bitmaps in embodiments of the invention in which a "side-by-side" printing protocol is employed. A bitmap suitable for the deposition of the catalyst-containing (e.g., Model A) formulation is illustrated in FIG. 6A and a bitmap suitable for the deposition of the activator-containing (e.g., Model B) formulation is illustrated in FIG. 6B. When the droplets are of both formulations have the same or approximately the same weight, the bitmaps are useful for at a 50:50 w/w ratio. White boxes represent vacant locations, dotted boxes represent droplets of catalyst-containing formulation and wavy boxes represent droplets of activator-containing formulation. Each patterned (wavy/dotted) box represents a pixel (e.g., one formulation droplet). A drop of the catalyst-containing formulation (dotted boxes) is deposited adjacent to a drop of the activator-containing formulation.

Figure 7:
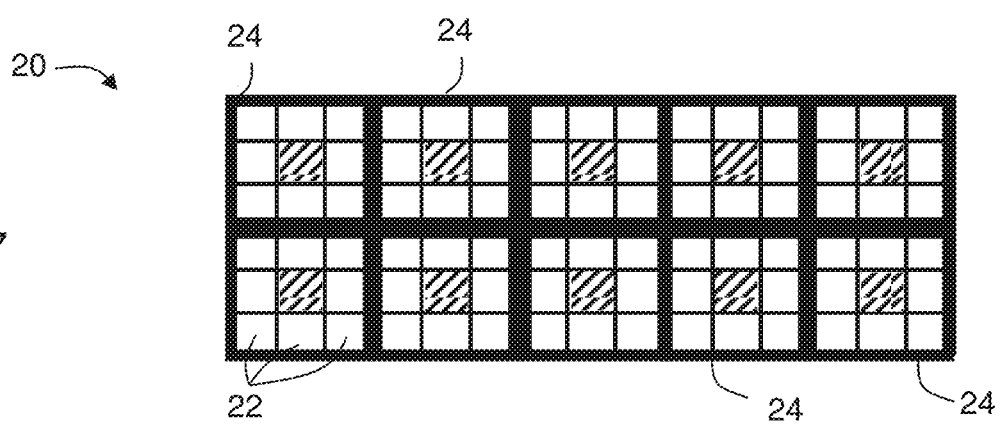

FIG. 7 is a schematic illustration of a layer having a plurality of voxels arranged in blocks, according to some embodiments of the present invention.

Figure 8A:
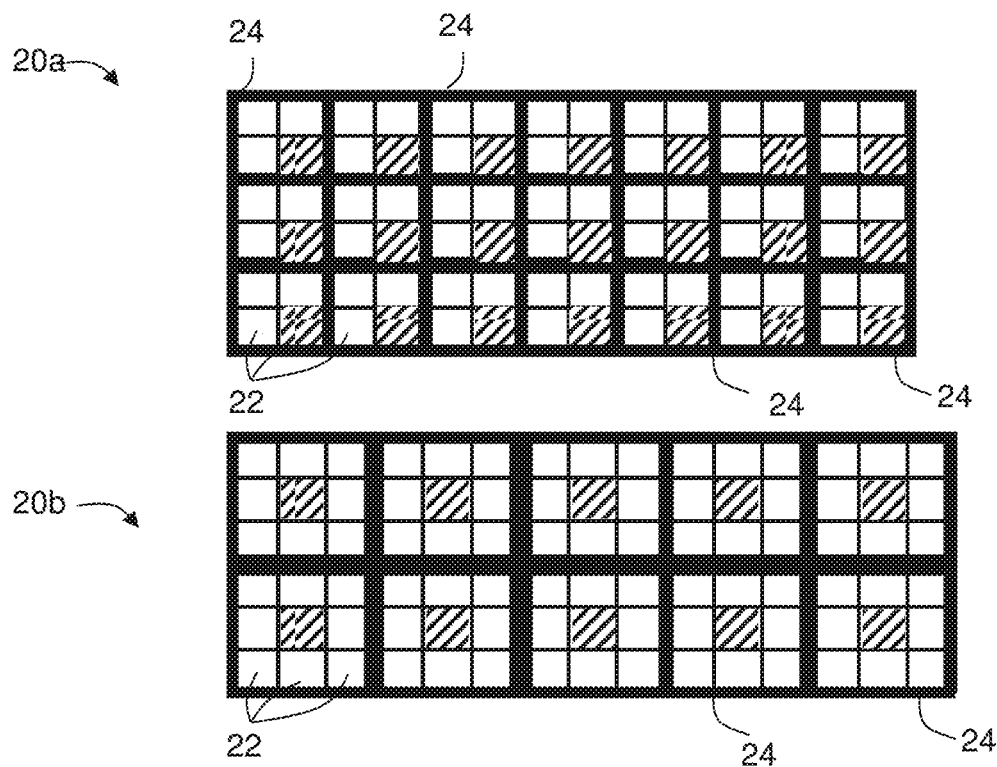

FIG. 8A is a schematic illustration of two layers, each having a plurality of voxels arranged in blocks, according to some embodiments of the present invention.

Figure 8B:
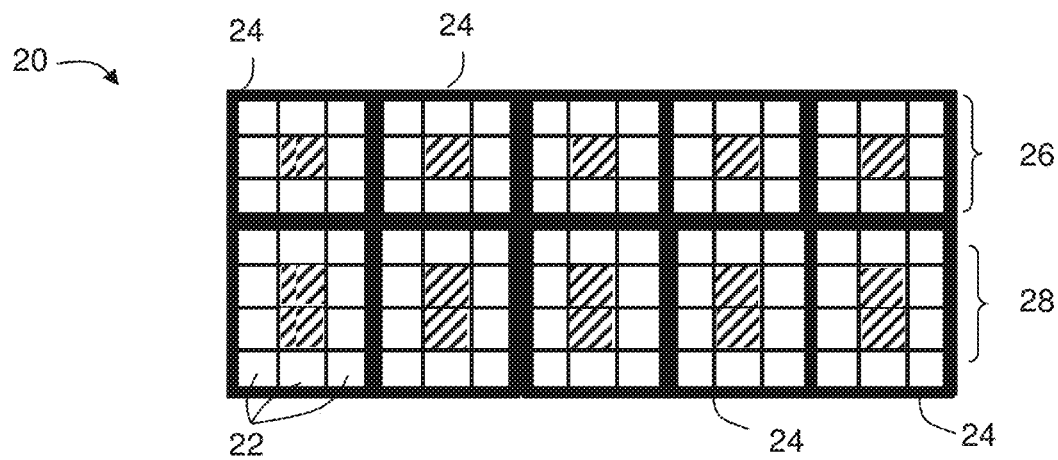

FIG. 8B is a schematic illustration of a layer having two regions, according to some embodiments of the present invention.

DESCRIPTION OF SPECIFIC EMBODIMENTS
OF THE INVENTION

The present invention, in some embodiments thereof, relates to three-dimensional inkjet printing and, more particularly, but not exclusively, to formulation systems usable in three-dimensional inkjet printing of polyamide materials, to methods of three-dimensional inkjet printing of objects comprising polyamide materials and to three-dimensional objects obtained by these methods.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present inventors have now designed a methodology for inkjet printing of objects made of, or comprising, polyamide materials (e.g., objects comprising polymerized lactams). These methodologies can be performed while utilizing a multi-part (e.g., two-part) model formulation system, which comprises components of a polyamide-forming system, while meeting the requirements of a three-dimensional inkjet printing process and system in terms of, for example, the properties of the uncured formulations, compatibility with the printing system, and the curing time of the formed formulation, and while further controlling the (e.g., mechanical) properties of the formed object.

The devised formulations feature a viscosity and reactivity that allow jetting the formulations through the inkjet printing heads and nozzles, with minimized clogging, at a curing time that allows dispensing droplets of the formulations in layers, and provide objects featuring mechanical properties that are at least equal if not superior to those obtained for polyamide-containing materials prepared by casting processes.

The devised formulation system comprises one formulation that comprises one or more curable (polymerizable) lactam monomer(s) (referred to herein as Model A formulation, or as a first model formulation), and at least one other formulation that comprises a promoter (activator) of an anionic ring opening polymerization of the lactam (referred to herein as Model B formulation, or as a second model formulation). Such a formulation system, upon subjecting the jetted formulations to conditions that effect anionic ring opening polymerization of the lactam, forms a polyamide-containing material which can feature a set of selected properties.

Herein throughout, the phrase "building material" describes two major categories of material: 'modeling material', i.e., the hardened (cured) material that forms the final product (e.g., object) of the 3D printing process, and the hardened (cured) 'support material'.

The support material serves as a supporting matrix for supporting the object or object parts during the fabrication process and/or other purposes, e.g., for hollow or porous objects, or to support overhangs. The support material, when cured, is preferably water dispersible to facilitate its removal once the buildup of object is completed. The formulation (composition) used to form the cured support material is preferably dispensed in liquid form and is typically curable by radiation, such as, but not limited to, electromagnetic radiation (e.g., ultraviolet radiation, visible light radiation, infrared radiation), and electron beam radiation, so as to form the support material. Also contemplated are support materials which comprise a wax component, and, optionally, also a viscosity modifying component. These types of support materials are in liquid form at the inkjet printing temperatures, solidify once cooled after being dispensed, and do not require curing by radiation.

The modeling material is generally made of a formulation (composition) which is formulated for use in inkjet technology and which forms the three-dimensional object, typically upon curing. The modeling material is generally made of a curable material, formulated for use in inkjet technology, and which is able to form the three-dimensional object on its own, i.e., without having to be mixed or combined with any other substance. An uncured modeling material formulation is preferably dispensed in liquid form and is curable by radiation, such as, but not limited to, electromagnetic radiation (e.g., ultraviolet radiation, visible light radiation, infrared radiation), and electron beam radiation, or by heat delivered convectively or conductively, so as to form the hardened (cured) modeling material.

The phrase "modeling material" is also referred to herein and in the art as "model material" or simply as "model".

Herein throughout, the phrases "building material formulation", "uncured building material", "uncured building material formulation", and other variations therefore collectively describe the materials that are dispensed to sequentially form the layers, as described herein. This phrase encompasses uncured materials dispensed so as to form the printed object, namely, one or more uncured modeling material formulation(s), and uncured materials dispensed so as to form the support, namely uncured support material formulations.

Herein, the phrase "printed object" describes the product of the 3D inkjet process, before the support material, if such has been used as part of the uncured building material, is removed.

Herein throughout, the term "object" or "model object" describes a final product of the 3D inkjet printing process. This term refers to the product obtained by a method as described herein, after removal of the support material, if such has been used as part of the uncured building material. The "object" therefore essentially consists (e.g., at least 95 weight percents) of a cured modeling material.

The term "object" as used herein throughout refers to a whole object or a part thereof.

The phrase "modeling material", "cured modeling material" or "hardened modeling material" can be regarded as a cured building material wherein the building material consists only of a modeling material formulation (and not of a support material formulation). That is, this phrase refers to the portion of the building material, which is used to provide the final object.

Herein throughout, the phrase "modeling material formulation", which is also referred to herein interchangeably as "modeling formulation", "model formulation" or simply as "formulation", describes a part or all of the uncured building material which is dispensed so as to form the object, as described herein. The modeling material formulation is an uncured modeling formulation (unless specifically indicated otherwise), which, upon exposure to a condition that effects curing (to curing energy), forms the object or a part thereof.

The terms "formulation" and "composition" are used interchangeably herein throughout.

In some embodiments of the present invention, a modeling material formulation is formulated for use in three-dimensional inkjet printing and is able to form a three-dimensional object on its own, i.e., without having to be mixed or combined with any other substance.

An uncured building material can comprise two or more modeling formulations, and, in some embodiments, can be dispensed such that different parts of the object are made, upon curing, of different cured modeling formulations, and hence are made of different cured modeling materials or different mixtures of cured modeling materials.

In some embodiments of the invention both the hardened (cured) support and model materials are obtained using the same type of curing.

The phrase "multi-material model", as used herein and in the art, describes an object (model) featuring macroscopic domains of different modeling materials in at least a portion thereof, for example, a printed object that is comprised of portions having different properties, e.g. mechanical properties, such as flexibility, rigidity, toughness, elasticity and so on, such that, for example, an object may comprise a combination of a flexible portion and a rigid portion. This phrase encompasses an object featuring domains of different modeling materials, wherein the modeling materials differ from one another by the ratio of the compositions (formulations) that are used to form the modeling material.

The phrase "digital materials", as used herein and in the art, describes a combination of two or more materials on a microscopic scale or voxel level such that the printed zones of a specific material are at the level of few voxels. Such digital materials may exhibit new properties that are affected by the selection of types of materials and/or the ratio and relative spatial distribution of two or more materials, at the voxel level, as described herein.

In exemplary digital materials, the modeling material of each voxel or voxel block, obtained upon curing, is independent of the modeling material of a neighboring voxel or voxel block, obtained upon curing, such that each voxel or voxel block may result in a different model material and the new properties of the whole part are a result of a spatial combination, on the voxel level, of several different model materials.

Herein throughout, whenever the expression "at the voxel level" or "on the voxel level" is used in the context of a different material and/or properties, it is meant to include differences between voxel blocks, as well as differences between voxels or groups of few voxels. In preferred embodiments, the properties of the whole part are a result of a spatial combination, on the voxel block level, of several different model materials.

Figure 1:
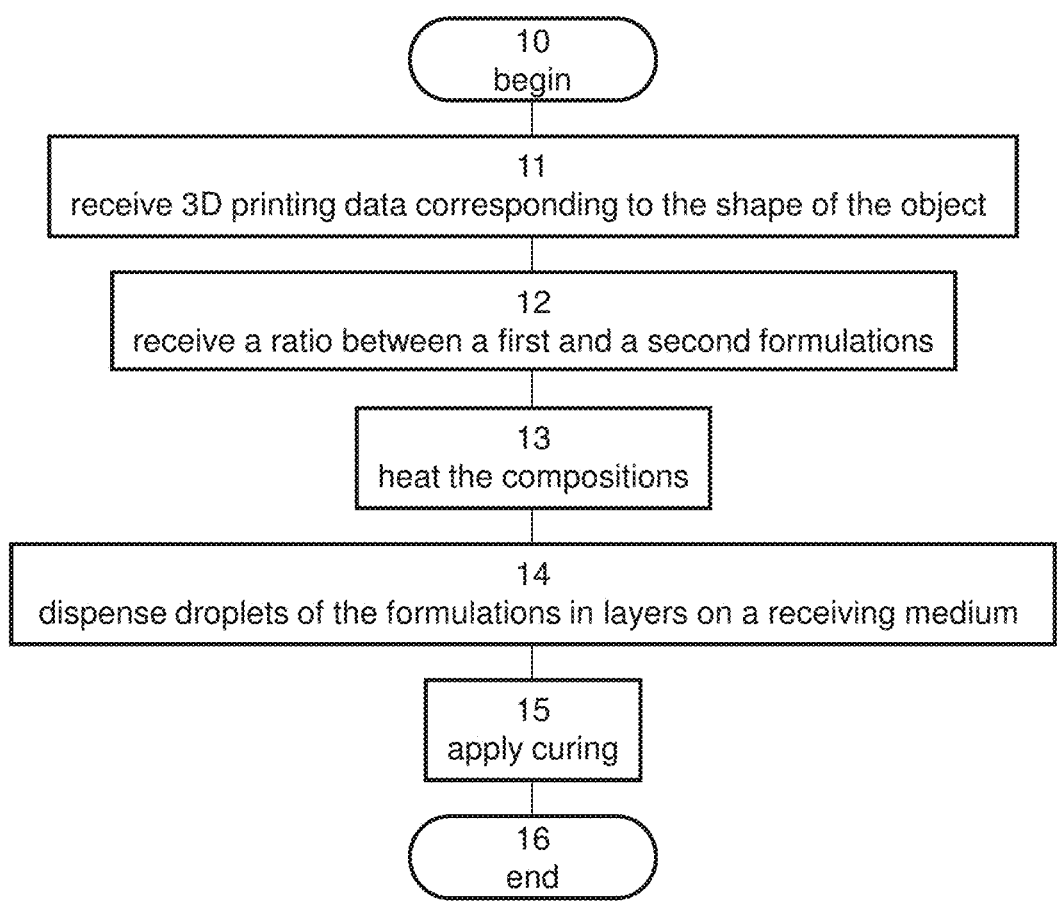
FIG. 1 is a flowchart diagram of a method suitable for fabricating an object by three-dimensional (3D) inkjet printing according to aspects of some embodiments of the present invention.

The Method:

FIG. 1 is a flowchart diagram of a method suitable for fabricating an object by three-dimensional (3D) inkjet printing according to aspects of some embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method begins at 10 and optionally and preferably continues to 11 at which 3D printing data corresponding to the shape of the object is received. The data can be received, for example, from a host computer which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

Optionally, but not necessarily, the method proceeds to 12 at which a ratio between a first model formulation and a second model formulation is received. While the embodiments below are described with a particular emphasis on a ratio between two model formulations, it is to be understood that more detailed reference to a ratio between two model formulations is not to be interpreted as indicating that embodiments in which a ratio between more than two model formulations are not contemplated. Thus, embodiments of the present invention contemplate receiving a ratio between N model formulations, where N is at least 2, and can be 2, 3, 4, or more. The ratio is typically expressed in terms of the volumes of the respective model formulations, but may also be expressed in terms of other extensive physical properties, such as the weights of the respective model formulations. A representative example of a received ratio for two model formulations is X1:X2, where X1 and X2 are the extensive physical properties (e.g., weight, volume) of the first and second model formulations. A representative example of a received ratio for three or more model formulations is X1:X2: . . . :XN, where N is the number of the model formulations (N>2, in the present example) and X1, X2, . . . , XN are the extensive physical properties (e.g., weight, volume) of the respective model formulations. An exemplary such ratio, a weight ratio, is also referred to herein as A:B ratio.

In some of any of the embodiments described herein, the method comprises selecting a weight ratio A:B of a first model formulation and a second model formulation, in which A represents the part by weight of the first model formulation and B represents a part by weight of the second formulation, of the total weight of the first and second formulations. In some embodiments, the A:B weight ratio ranges from about 9:1 to about 1:9, or from about 9:1 to 1:2, or from about 9:1 to 1:1, or from about 8:2 to 1:1, and can be, for example, 9:1, 8:1, 7:1, 6:1, 5:1, 4:1, 3:1, 2.5:1, 2:1, 1.5:1 1:1 or 1:1.5, including any intermediate values and subranges therebetween. It is to be understood that whenever a weight ratio A:B is indicated, it corresponds to the relative weight percents of the first and second formulations of the total weight of the first and second formulations. For example, a 3:1 weight ratio corresponds to 75% weight percents of formulation A and 25 weight percents of formulation B. A 4:1 weight ratio corresponds to 70 weight percents of formulation A and 20 weight percents of formulation B.

The ratio can be received as a user input or can be obtained from an external source, such as, but not limited to, a computer that provides a predetermined ratio or calculates it. In these embodiments, at least two of the model formulations comprise substances (materials) that react chemically with one another to form a building (e.g., modeling) material. The properties of the building (e.g., modeling) material that is formed by the chemical reaction typically depend on the selected ratio. The computer can thus calculate the ratio based on the desired properties of the building (e.g., modeling) material. Also contemplated are embodiments in which instead of receiving the ratio the method receives building (e.g., modeling) material properties and calculates the ratio based on the received properties.

Optionally, the method continues to 13 at which the first and/or second model formulations are heated. These embodiments are particularly for model formulations that are either solid or are liquid yet have relatively high viscosity at the operation temperature of the working chamber of the 3D printing system. The heating of the model formulation(s) is preferably to a temperature that allows jetting the respective model formulation through a nozzle of a printing head of a 3D printing system. In some embodiments, the heating of the model formulation is to a minimal temperature at which the respective model formulation is in a liquid form, e.g., above the highest melting point of a material in the model formulation. In some embodiments of the present invention, the heating is to a temperature at which the respective model formulation exhibits a viscosity in a range of from about 8 centipoises and up to no more than X centipoises, where X is about 35 centipoises, or about 30 centipoises, preferably about 25 centipoises and more preferably about 20 centipoises, or 18 centipoises, or 16 centipoises, or 14 centipoises, or 12 centipoises, or 10 centipoises, and at which the model formulation cannot undergo thermal curing (e.g., below a temperature at which curing, as defined herein, can be effected). Thus, denoting the temperature at which the viscosity of the respective model formulation is X centipoises by $T_1$ and the temperature at which thermal curing is effected for that model formulation by $T_2$, the heating at 13 is preferably to a temperature T satisfying $T_1 < T < T_2$.

The heating 13 can be executed before loading the respective model formulation into the printing head of the 3D printing system, or while the model formulation is in the printing head or while the model formulation passes through the nozzle of the printing head.

In some embodiments, heating 13 is executed before loading of the respective model formulation into the printing head, so as to avoid clogging of the printing head by the model formulation in case its viscosity is too high.

In some embodiments, heating 13 is executed by heating the printing heads, at least while passing the first and/or second model formulation(s) through the nozzle of the printing head.

In some embodiments, both the first and second (or all other) model formulations are heated, and in some embodiments, only one (or more) of the model formulations is heated, while the other model formulation(s) exhibit a desired viscosity of less than 25 centipoises at ambient temperature.

The method continues to 14 at which droplets of the model formulations are dispensed in layers, on a receiving medium, using at least two different inkjet printing heads, according to the printing data. The receiving medium can be a tray of a three-dimensional inkjet system or a previously deposited layer.

In some embodiments of the present invention, the dispensing 14 is effected under a generally dry and inert environment.

As used herein "generally dry environment" means an environment having a relative humidity of less than 50% or less than 40% or less than 30% or less than 20% or less than 10%, preferably less than 5%, or less than 2% or less than 1% or less.

As used herein "inert environment" means an environment that is substantially free of oxygen, carbon dioxide, water and/or any other substances that may chemically react with the first and second model formulations or otherwise interfere in the chemical reaction between substances in the first and second model formulations.

As used herein, "substantially free" means less than 1% or less than 0.5%, or less than 0.1%, or less than 0.05%, or less than 0.01% of a substance that may interfere in the chemical reaction.

An inert environment can be established by supplying an inert gas or an inert gas mixture into the working chamber of the 3D printing system. Representative examples of an inert gas include, but are not limited to, nitrogen and/or argon.

In some embodiments, the inert environment is a dry inert environment, such as dry nitrogen and/or argon.

Accordingly, as used herein, "inert" environment or "inert" atmosphere is not limited to an environment consisting of inert gases, but can mean either an inert gas, a mixture of inert gases, or a vacuum.

The method optionally and preferably continues to 15 at which curing energy is applied to the deposited layers. Preferably, the curing is applied to each individual layer following the deposition of the layer and prior to the deposition of the previous layer.

In some embodiments, the applied curing energy in 15 is thermal energy.

Applying thermal energy can be effected, for example, by heating a receiving medium onto which the layers are dispensed. In some embodiments, the heating is effected using a resistive heater.

In some embodiments, the heating is effected by irradiating the dispensed layers by heat-inducing radiation. Such irradiation can be effected, for example, by means of an IR lamp or Xenon lamp, operated to emit radiation onto the deposited layer.

Alternatively, or in addition, the applied curing energy is electromagnetic irradiation, as described herein.

In some embodiments, two or more different curing energies are applied. In some of these embodiments, curing energy of a first type is applied and then curing energy of a second type is applied. For example, the first curing energy can be in the form of UV radiation and the second curing energy can be in the form of thermal energy delivered by convection, conduction and/or radiation.

In some embodiments, applying a curing energy is effected under a generally dry and inert environment, as described herein.

The method ends at 16.

In some embodiments, the method is effected such that for at least one region of the object, the dispensing of the droplets is selected to form voxel blocks, wherein, for each block, a ratio between a number of voxels of the first model formulation in the block and a number of voxels of the second model formulation in the block corresponds to the selected ratio between the at least first and second model formulations.

These embodiments are illustrated in FIG. 7 which shows a layer 20 having a plurality of voxels 22 arranged in blocks 24.

Herein throughout, the term "voxel" describes a volume element deposited by a single nozzle of a three-dimensional printing system.

Herein throughout, the term "voxel block" describes a group of voxels wherein each voxel in the group is adjacent to at least one other voxel in the group.

Voxels occupied with the first model formulation are shown in FIG. 7 as white and voxels occupied with the second model formulation are marked in FIG. 7 with hatching. In the representative example of FIG. 7, which is not intended to be limiting, each block includes 9 voxels, wherein the ratio between a number of voxels of the first model formulation and a number of voxels of the second model formulation in the block is 8:1.

In various exemplary embodiments of the invention the ratio 8:1 corresponds to the ratio received or calculated at 12. For example, when the same amount (e.g., weight, volume) of model formulation is deposited onto each voxel, the ratio between the number of voxels can be the same as the ratio received or calculated at 12. When the amount of model formulation in a voxel occupied with the first model formulation is not the same as the amount of model formulation in a voxel occupied with the second model formulation, the ratio between the numbers of voxels is obtained by correcting the ratio received or calculated at 12 using the amounts in the respective voxels. In other words, the ratio between the numbers of voxels in a block is selected such that the ratio between the amounts of model formulations deposited within the block approximately equals the ratio received or calculated at 12. As a representative example, consider a process in which the method receives a ratio X1:X2=4:1, and in which the amount of the first model formulation per voxel is 2 times the amount of the second model formulation per voxel. In this case, a ratio of 8:1 between the number of voxels corresponds to a ratio of 4:1 between the amounts since 8/2=4/1. The correction of the ratio the ratio received or calculated at 12 using the amounts in the respective voxels, can be done by a controller that is integrated in the three-dimensional printing system (e.g., controller 52, see FIG. 4 described below), or, alternatively by a data processor or a computer that is external to the three-dimensional printing system (e.g., computer 54, see FIG. 4 described below).

In some embodiments, a ratio is selected between a first model formulation and a second model formulation.

In some embodiments, a ratio is selected between three or more model formulations, that is a first model formulation, a second model formulation, a third model formulation, and optionally a fourth model formulation, a fifth model formulation and so on.

For simplicity, the following description relates to embodiments where a first and a second model formulation are used. However, it is to be noted that embodiments in which more than two model formulations are utilized are also contemplated, as stated hereinabove.

In some embodiments, each voxel block as defined herein comprises from 2 to 100 voxels or from 2 to 80 voxels or from 2 to 60 voxels or from 2 to 40 voxels or from 2 to 30 voxels or from 2 to 20 voxels or from 2 to 10 voxels or from 2 to 8 voxels or from 2 to 6 voxels or from 2 to 4 voxels or from 10 to 80 voxels or from 10 to 60 voxels or from 10 to 40 voxels.

In some preferred embodiments of the invention each droplet occupies a single voxel upon deposition of the droplet. Thereafter, and before curing, the droplet may spread to one or more adjacent voxels.

It is appreciated that more than one ratio between the model formulations can be received or calculated. When more than one ratio between the model formulations is employed, different ratios can correspond to different layers or different regions in the same layer. These embodiments are illustrated in FIGS. 8A and 8B.

FIG. 8A illustrates two layers 20a and 20b, each having a plurality of voxels 22 arranged in blocks 24. In layer 20a each block includes 3 voxels of the first model formulation and 1 voxel of the second model formulation, and in layer 20b each block includes 8 voxel of the first model formulation and 1 voxel of the second model formulation. Since different ratios between the model formulations correspond to different properties of the building (e.g., modeling) material formed by the reaction of the model formulations with each other, the different ratios in layers 20a and 20b can be selected to ensure that the properties of the building (e.g., modeling) materials formed in each layer are also different.

FIG. 8B illustrates a layer 20 having two regions designated 26 and 28. In the representative example of FIG. 8B, which is not intended to be limiting, each block in region 26 includes 9 voxels, and each block in region 28 includes 12 voxels. Region 26 includes blocks of voxels wherein the ratio between a number of voxels of the first model formulation and a number of voxels of the second model formulation in each block is 8:1; and region 28 includes blocks of voxels wherein the ratio between a number of voxels of the first model formulation and a number of voxels of the second model formulation in each block is 12:2.

Since different ratios between the model formulations correspond to different properties of the building (e.g., modeling) material formed by the reaction of the substances in the model formulations with each other, the different ratios in regions 26 and 28 can be selected to ensure that the properties of the building (e.g., modeling) materials formed in each region of the same layer are also different.

In any of the above embodiments, the first and second model formulations begin to mix within each block 24 following their deposition on the receiving medium, typically upon being exposed to curing energy. The mixing and/or curing results in a building (e.g., modeling) material which is optionally and preferably chemically different to any of the first and second model formulations and which occupies most or all the voxels in the respective block 24. Preferably, the distribution of the building (e.g., modeling) material, once formed, is generally uniform over the entire block 24.

As used herein "generally uniform distribution" means a deviation from uniformity of less than 30% or 20% or less than 10% or less than 5%.

The distribution of the building (e.g., modeling) material can be measured with respect to any extensive property, including, without limitation, weight and volume.

In some embodiments, all the voxels in at least one voxel block participate in a reaction between the first and second model formulations, such that the cured building material that results from the reaction, following the exposure to the curing energy, is substantially homogenous.

As used herein, "substantially homogenous" means that the building material in a voxel block vary in weight percent of its ingredients by less than 10% or less than 8% or less than 6% or less than 4% or less than 2% or less than 1% or less than 0.5% or less than 0.25%.

To ensure reaction between the first and second model formulations, the deposition of the model formulations can be performed in more than one way.

In some embodiments of the present invention a "Drop on Drop" printing protocol is employed. These embodiments are schematically illustrated in FIGS. 5A and 5B. A bitmap suitable for the deposition of the first model formulation is illustrated in FIG. 5A and a bitmap suitable for the deposition of the second model formulation is illustrated in FIG. 5B. White boxes represent vacant locations, dotted boxes represent droplets of the first model formulation and wavy boxes represent droplets of the second model formulation. The printing data in these embodiments are such that for each layer, both model formulation s are deposited at the same location, but different times, during movement of the printing head. For example, each droplet of a first model formulation can be jetted on top of a droplet of a second model formulation, or vice versa. Preferably, but not necessarily, the two formulation parts are jetted in drops at the same weight and/or rate. These embodiments are particularly useful when the desired weight ratio is 1:1. For other desired weight ratios, the two formulation parts are preferably jetted in drops of different weights, wherein the ratio of the weights corresponds to the desired ratio.

A representative example for a resolution suitable for the present embodiments is 1200 dpi in the X direction and 300 dpi in the Y direction. The drop on drop printing protocol allows the two types of drops to combine and mix before the crystallization of deposited material.

In some embodiments of the present invention a "side by side" printing protocol is employed. These embodiments are schematically illustrated in FIGS. 6A and 6B. A bitmap suitable for the deposition of the first model formulation is illustrated in FIG. 6A and a bitmap suitable for the deposition of the second model formulation is illustrated in FIG. 6B. The white, dotted and wavy boxes represent vacant locations, droplets of the first model formulation and droplets of the second model formulation, respectively. The printing data in these embodiments is such that for each layer, each drop of a first model formulation is jetted adjacent to a drop of a second model formulation, or vice versa. Due to drop spreading, the adjacent drops tend to partially overlap. As a result, the two drops diffuse toward each other, mix and react after deposition.

In the schematic illustrations shown in FIGS. 5A-6B, chessboard bitmaps are illustrated, but this need not necessarily be the case, since, for some applications, other bitmap patterns can be employed.

In some of any of the embodiments described herein, the building material further comprises a support material.

In some of any of the embodiments described herein, dispensing a building material formulation (uncured building material) further comprises dispensing support material formulation(s) which form the support material upon application of curing energy.

Dispensing the support material formulation, in some embodiments, is effected by inkjet printing head(s) other than the inkjet printing heads used for dispensing the first and second (and other) model formulations forming the modeling material.

In some embodiments, exposing the building material to curing energy includes applying a curing energy that affects curing of a support material formulation, to thereby obtain a cured support material.

In some of any of the embodiments described herein, once a building material is cured, the method further comprises removing the cured support material. Any of the methods usable for removing a support material can be used, depending on the materials forming the modeling material and the support material. Such methods include, for example, mechanical removal of the cured support material and/or chemical removal of the cured support material by contacting the cured support material with a solution in which it is dissolvable (e.g., an alkaline aqueous solution).

As used herein, the term "curing" describes a process in which a formulation is hardened. This term encompasses polymerization of monomer(s) and/or oligomer(s) and/or cross-linking of polymeric chains (either of a polymer present before curing or of a polymeric material formed in a polymerization of the monomers or oligomers). The product of a curing reaction is therefore typically a polymeric material and in some cases a cross-linked polymeric material. This term, as used herein, encompasses also partial curing, for example, curing of at least 20% or at least 30% or at least 40% or at least 50% or at least 60% or at least 70% of the formulation, as well as 100% of the formulation.

A "curing energy" typically includes application of radiation or application of heat, as described herein.

A curable material or system that undergoes curing upon exposure to electromagnetic radiation is referred to herein interchangeably as "photopolymerizable" or "photoactivatable" or "photocurable".

When the curing energy comprises heat, the curing is also referred to herein and in the art as "thermal curing" and comprises application of thermal energy. Applying thermal energy can be effected, for example, by heating a receiving medium onto which the layers are dispensed or a chamber hosting the receiving medium, as described herein. In some embodiments, the heating is effected using a resistive heater.

In some embodiments, the heating is effected by irradiating the dispensed layers by heat-inducing radiation. Such irradiation can be effected, for example, by means of an IR lamp or Xenon lamp, operated to emit radiation onto the deposited layer.

In some embodiments, heating is effected by infrared radiation applied by a ceramic lamp, for example, a ceramic lamp that produces infrared radiation of from about 3 μm to about 4 μm, e.g., about 3.5 μm.

In some of any of the embodiments described herein, the method further comprises exposing the cured modeling material, either before or after removal of a support material, if such has been included in the building material, to a post-treatment condition. The post-treatment condition is typically aimed at further hardening the cured modeling material, and, optionally, for preventing or reducing its oxidation. In some embodiments, the post-treatment hardens a partially-cured material to thereby obtain a completely cured material.

In some embodiments, the post-treatment is effected by exposure to heat or radiation, under reduced pressure (e.g., vacuum) or at atmospheric pressure, under inert atmosphere, as described in any of the respective embodiments herein. In some embodiments, when the condition is heat, the post-treatment can be effected for a time period that ranges from a few minutes (e.g., 10 minutes) to a few hours (e.g., 1-24 hours).

The Modeling Material Formulations:

An uncured building material formulation used in the method described herein comprises at least two modeling material formulations which form together a polyamide-forming system.

These modeling formulations comprise substances that chemically react with one another once contacted and exposed to curing (e.g., thermal curing), via anionic ring opening polymerization (anionic ROP), to form a polyamide-containing material.

As discussed hereinabove, a polyamide-forming system is comprised of a lactam as a curable material which forms the main portion of the polyamide, a catalyst, and an activator (promoter) which activates the lactam towards the anionic ROP by attaching to the lactam.

While promoters are often used to accelerate a polymerization reaction, that is, to affect the reaction kinetics, some promoters are designed and/or selected to impart to the final polymeric material additional properties, or to modify properties of the polymeric material. As an example, a promoter can be a material that forms a block-copolymer when reacting with a monomer (or an oligomer, or a mixture of monomers and/or oligomers), upon exposure to curing energy. In another example, the promoter introduces to the formed polymeric material a moiety that imparts or modifies a property in the polymeric material as described herein. In another example, the promoter induces cross-linking of the formed polymeric material and thereby modifies a property in the polymeric material as described herein.

Kinetic properties of anionic ROP and mechanical properties of a polyamide formed by anionic ROP are typically determined, at least in part, by the type of the activator. However, while highly reactive activators may provide for required kinetic parameters (e.g., curing rate), such activators were found by the present inventors to be incompatible with 3D inkjet printing system due to contamination of the system's parts. On the other hand, less reactive activators were found by the present inventors to provide too low curing rates.

The present inventors have studied various formulation systems and have devised, based on these studies, formulation systems that are suitable for use in fabricating polyamide-containing objects by 3D inkjet printing.

By "polyamide-containing object" it is meant an object, as defined herein, which is formed, in at least a part thereof, of a polyamide-containing polymeric material. That is, at least a portion of the (cured) modeling material forming the object is or comprises a polyamide-containing polymeric material.

The phrase "polyamide-containing polymeric material" is also referred to herein interchangeably as "polyamide-containing material" or "polyamide-based material", describes a polymeric (cured) material, at least a portion of which is a polyamide that is formed by polymerization of a precursor (a curable monomer) thereof. That is, the final polymeric material comprises at least one polymeric chain that is a product of an anionic ROP of a precursor of a polyamide, as described herein.

In some embodiments, the polyamide-containing material comprises at least 50%, preferably at least 60% by weight of a polyamide. In some embodiments, the polyamide-containing material further comprises a polyester, for example, a polyester made by anionic ROP of a lactone, e.g., a caprolactone. Such materials are obtainable, for example, when one or more of the formulations further comprises a lactone. The concentration of the polyester in the polyamide-containing material can be, for example, from 1 to 40% by weight, or from 1 to 20% by weight, of the polyamide-containing material.

Materials and formulations comprising such materials which are usable for forming polyamide-containing polymeric materials are also referred herein as "polyamide-forming materials" or "polyamide-forming system" or simply as "polyamide system".

A precursor of a polyamide is also referred to herein as a curable material, which, when exposed to a suitable curing energy (e.g., heat) in the presence of suitable catalyst and promoter, polymerizes, preferably via anionic ROP, to form a polyamide.

Exemplary precursors of polyamides that polymerize by anionic ring-opening polymerization are lactams, such as caprolactam, piperidone, pyrrolidone and laurolactam.

Additional examples include, but are not limited to, 2-Azetidinone, 2-pyrrolidinone, δ-Valerolactam, DL-α-Amino-ε-caprolactam, 2-Azacyclononanone, 1-Aza-2-cyclooctanone ε-caprolactam, and other lactam derivatives.

An exemplary, commonly used, lactam is a caprolactam, and more specifically ε-caprolactam. Whenever "caprolactam" is mentioned herein, ε-caprolactam is encompassed.

In some of any of the embodiments described herein for polyamide-forming materials, the lactam is caprolactam, laurolactam or a mixture thereof. In some embodiments, the lactam is caprolactam.

While reference is made herein to a lactam polyamide precursor, it is to be noted that any other polyamide precursor can be used in any of the embodiments described herein.

Embodiments of the present invention therefore relate to formulation systems which comprise polyamide forming materials, and which form a polyamide-containing modeling material upon curing (e.g., thermal curing). These formulation systems can therefore be regarded as modeling material formulation systems, and each of the formulations included in these systems can be regarded as a modeling material formulation.

The formulation systems comprise at least two formulations, and may comprise two, three, four, or more formulations. For simplicity, the formulation systems are described herein as two-part formulation systems, but it is to be noted that three-part, four-part, five-part formulations are also contemplated.

The formulation systems described herein include at least two formulations:

a first formulation (e.g., Model A formulation) which comprises at least one polyamide precursor, as described herein, preferably a lactam such as caprolactam; and a second formulation (e.g., Model B formulation) which comprises an activator for promoting anionic ROP of the polyamide precursor.

Any material that is usable for promoting anionic ROP of a polyamide precursor is contemplated as an activator according to some of the present embodiments.

Exemplary lactam activators include, lactams N-substituted by electrophilic (electron-withdrawing) moieties, aliphatic diisocyanates, aromatic diisocyanates, polyisocyanates, aliphatic diacyl halides and aromatic diacyl halides, and any combination thereof.

Lactams N-substituted by electrophilic moieties include for example acyllactams.

Aliphatic diisocyanates include compounds such as butylene diisocyanate, hexamethylene diisocyanate, octamethylene diisocyanate, decamethylene diisocyanate, undodecamethylene diisocyanate, dodecamethylene diisocyanate, 4,4'-methylenebis(cyclohexyl isocyanate), isophorone diisocyanate.

Aromatic diisocyanates include compounds such as tolyl diisocyanate, and 4,4'-methylenebis(phenyl)isocyanate.

Polyisocyanates include, for example, isocyanurates of hexamethylene diisocyanate, allophanates (for example ethyl allophanate).

Aliphatic diacyl halides include, for example, compounds such as butylene diacyl chloride, butylene diacyl bromide, hexamethylene diacyl chloride, hexamethylene diacyl bromide, octamethylene diacyl chloride, octamethylene diacyl bromide, decamethylene diacyl chloride, decamethylene diacyl bromide, dodecamethylene diacyl chloride, dodecamethylene diacyl bromide, 4,4'-methylenebis(cyclohexyl acid chloride), 4,4'-methylenebis(cyclohexyl acid bromide), isophorone diacyl chloride, isophorone diacyl bromide.

Aromatic diacyl halides include, for example, compounds such as tolylmethylene diacyl chloride, tolylmethylene diacyl chloride, 4,4'-methylenebis(phenyl)acid chloride, 4,4'-methylenebis(phenyl)acid bromide.

Additional activators include, for example, acyl lactams, such as disclosed in EP Patent No. 1449865, oxazolines such as disclosed in EP Patent No. 0786482, ethylenebisamides such as disclosed in U.S. Patent Application Publication No. 2010/0113661, isocyanates, and masked (capped, e.g., caprolactam-blocked) isocyanate compounds, such as, for example, hexamethylene diisocyanate (HDI).

Other liquid activator systems for anionic lactam polymerization are known in which isocyanate compounds are mixed with pyrrolidone compounds, e.g. N-methyl pyrrolidone or N-ethyl pyrrolidone, as described, for example, in EP Patent No. 0167907. EP Patent Application Nos. 0134616 and 0135233 disclose N-substituted carbamoyl-lactam compounds suitable as promoters or activators for anionic polymerization of lactams.

In some embodiments, the activator is included in the second formulation either per se or mixed with one or more other materials. In some embodiments, the activator is dissolved in the polyamide precursor (e.g., caprolactam). In some embodiments, the second formulation which contains the activator is devoid of the polyamide precursor, or is devoid of a lactam or is devoid of caprolactam.

The amount of the activator defines the number of growing chains, since every activator molecule represents the initial member of a polymer chain.

In some of any of the embodiments described herein, the activator is selected as capable of modifying a chemical, physical and/or mechanical property of the building material.

In some of these embodiments, a degree of the modifying is determined by selecting the ratio of the first and second formulations.

Many promoters for anionic ROP of caprolactam, which affect a property, and particularly a mechanical property, of the formed polymeric material are known in the art, and all such promoters are contemplated by embodiments of the present invention.

Non-limiting exemplary promoters, referred to also as "activators", which are usable in the context of these embodiments of the present invention are described, for example, in U.S. Pat. No. 3,304,291, which discloses activators consisting of organic nitrogen compounds having on at least 2 to 12 carbon hydrocarbon radical being an N-substituted compound of at least one urea, thiourea or guanidine radical; U.S. Pat. No. 3,770,689, which discloses polyether promoters in which the polymer chains are permanently terminated on at least one end by a promoter function, whereby the promoter functional groups or substituents are similar to monomeric promoters such as acid-chloride groups, isocyanates, N-carbonyl-lactam groups, imide groups, N-carbonyl-sulfonamide groups, N-carbonyl-urea groups and acid-anhydride groups; GB Patent No. 1,067,153 which discloses an isocyanate capped polypropylene glycol; in U.S. Pat. Nos. 3,862,262, 4,031,164, 4,034,015, and 4,223,112, which disclose additional polyol-polyacyl polymers used as promoters and forming Nylon block co-polymers or terpolymers; U.S. Pat. No. 9,139,752 which discloses capped (lactam-blocked) isocyanate as an activator (promoter); U.S. Patent Application Publication No. 2012/0283406 which discloses an aliphatic or alicyclic di- or multi-isocyanate compound; and EP Patent Application No. 2801588 which discloses (optionally caprolactam-blocked) isocyanate compounds based on hexamethylene diisocyanate (HDI). Any of the activators described hereinabove are also contemplated.

In some of any of the embodiments described herein, the activator is such that comprises a reactive moiety that is capable of attaching to the polyamide precursor and thereby activating it, and further comprises an additional moiety which, when present in the obtained polyamide material, imparts or modifies a property of the polymeric (polyamide) material. For example, the promoter can further comprise a moiety that imparts or modifies a property of the polyamide material compared to a Nylon6 polyamide made of caprolactam and an activator such as, for example, N-acetyl caprolactam.

In some embodiments, the activator is other than N-acetyl caprolactam.

Exemplary moieties that impart or modify a property of a polymeric material when present in a promoter according to these embodiments include, but are not limited to, impact modifying moieties, elastomeric moieties, optically-active moieties, light-absorbing moieties, conductive moieties, metal-chelating moieties, hydrophobic moieties, hydrophilic moieties and/or a chemically-reactive moieties, as these are defined herein.

Moieties capable of effecting cross-linking of polyamide chains are an example of moieties that affect properties of the formed polyamide, for example, impact resistance, elasticity, stiffness, toughness and the like.

Multifunctional moieties to which polyamide chains are attached are also an example of moieties that affect properties of the formed polyamide, for example, impact resistance, elasticity, stiffness, toughness and the like. Multifunctional activators, having two or preferably three or more groups that attach to the lactam are an example of materials that form such moieties.

An exemplary activator according to some of the present embodiments can be generally represented by Formula I:

A-(R)n              Formula I wherein:
A is the additional moiety that imparts or modifies a property of the polyamide-containing polymer, as described herein; R is N-acyl lactam, which is attached to a polyamide chain formed of the lactam; and n is a positive integer.

In some of any of the embodiments described herein for a lactam such as caprolactam, the activator comprises at least two N-acyl lactam groups, such that in Formula I, for example, n is 2 or is greater than 2 (e.g., 3 or 4).

An N-acyl lactam group is described herein as:

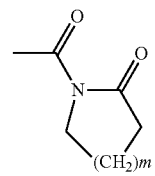

wherein m can be 1, 2, 3, 4, or 5. In N-acetyl caprolactam, m=3.

Exemplary promoters which are usable in the context of the embodiments described herein can be collectively represented by Formula II:

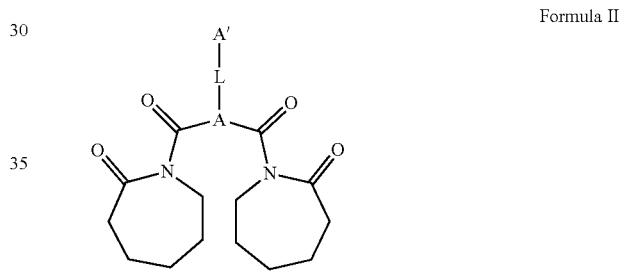

Formula II wherein A is the additional moiety that imparts or modifies a property of the polyamide-containing polymer; L is absent or is a linking moiety; and A' is absent or is another additional moiety, being the same or different from the moiety A.

In some embodiments, A is a hydrocarbon moiety, of e.g., 1-30 carbon atoms in length. The hydrocarbon moiety can be linear and/or cyclic, saturated or unsaturated, substituted or unsubstituted, and may be interrupted by one or more heteroatoms (e.g., O, N, or S). The hydrocarbon moiety can be composed of alkyl, alkenyl, alkynyl, cycloalkyl, aryl or any combination of these groups.

In a non-limiting example, A is an alkyl (alkylene chain) of 6 carbon atoms, terminating at both ends by amine groups, and the promoter is:

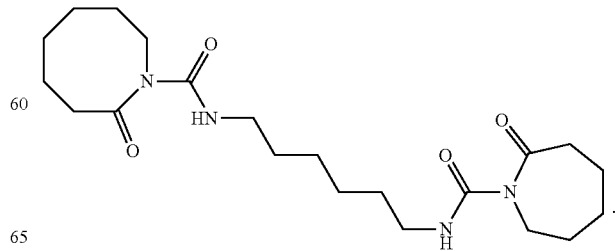

In some embodiments, A comprises a hydrocarbon moiety, as described herein, interrupted by one or more polymeric moieties.

In some embodiments, L is absent and in some embodiments L is a linking moiety connecting A to A'. The linking moiety can be a hydrocarbon moiety, as described herein, a polymeric moiety, or can comprise both, as described herein for A.

In some of these embodiments, A is a branched moiety, connected to L via a branching unit.

A' is as described herein for A.

In some embodiments, A' comprises at least one N-acyl lactam moiety, connected directly to the linking moiety, or to an A moiety.

In some embodiments, a polymeric moiety as described in any of these embodiments, is a poly(alkyene glycol) moiety (e.g., poly(ethylene glycol) or poly(propylene glycol)), a polyacyl moiety, a poloxamer, and any combination thereof. Such polymeric moieties, when included in the polymeric material obtained upon curing, typically modify a mechanical property (e.g., as described herein) of the obtained polyamide-containing polymer (the building material).

Another exemplary activator (promoter) according to these embodiments can be generally represented by Formula III:

$$A\text{-}(R)n \qquad \text{Formula III}$$

wherein:

A is the additional moiety that imparts or modifies a property of the polyamide-containing polymer, as described herein; R is an isocyanate group, which reacts with the lactam; and n is a positive integer.

In some of any of the embodiments described herein for a lactam such as caprolactam, the activator (promoter) comprises at least two isocyanate groups, such that in Formula I, for example, n is 2 or is greater than 2 (e.g., 3 or 4).

In some embodiments, A is a hydrocarbon moiety, of e.g., 1-30 carbon atoms in length. The hydrocarbon moiety can be linear and/or cyclic, saturated or unsaturated, substituted or unsubstituted, and may be interrupted by one or more heteroatoms (e.g., O, N, or S). The hydrocarbon moiety can be composed of alkyl, alkenyl, alkynyl, cycloalkyl, aryl or any combination of these groups.

In a non-limiting example, A is an alkyl (alkylene chain) of 6 carbon atoms, terminating at both ends by isocyanate groups.

In a non-limiting example, A is an isocyanurate moiety, substituted by 1, 2 or 3 isocyanate-containing moieties, for example, an alkyl terminated by isocyanate.

In some embodiments, A comprises a hydrocarbon moiety, as described herein, interrupted by one or more polymeric moieties.

In some embodiments, A is or comprises a polymeric moiety.

In some embodiments, a polymeric moiety as described in any of these embodiments, is or comprises a poly(alkyene glycol) moiety (e.g., poly(ethylene glycol) or poly(propyleneglycol)), a polyacyl moiety, a poloxamer, a polyol, and any combination thereof. Such polymeric moieties, when included in the polymeric material obtained upon curing, may modify a mechanical property (e.g., as described herein) of the obtained polyamide-containing polymer (the building material).

Any of the isocyanate-containing activators described herein can be used per se or can be blocked, for example, caprolactam-blocked.

Herein and in the art, the phrase "capped isocyanate" is also referred to interchangeably as "blocked isocyanate" and describes an isocyanate group which has been blocked by another functional group, e.g. a caprolactam group. This group typically acts as "protective group", blocking the isocyanate group during the reaction.

In some of any of the embodiments described herein, the activator is an isocyanate material.

Herein, the phrase "isocyanate material" encompasses a material which comprises at least one isocyanate group. The material can be a monomeric, oligomeric or polymeric material, and can be monofunctional, namely, having one isocyanate group, difunctional, namely, having two isocyanate groups, or multifunctional, having three or more isocyanate groups. Difunctional isocyanate materials are also referred to herein and in the art as diisocyanates. Multifunctional isocyanate materials are also referred to herein and in the art as polyisocyanates or poly(isocyanates).

Any of the isocyanate-containing materials usable as activators of anionic ROP of polyamide precursors are contemplated. Exemplary isocyanate materials are described hereinabove, and some exemplary isocyanate materials are represented By Formula III herein.

Any of the isocyanate materials can be blocked or non-blocked.

Exemplary non-blocked isocyanate activators include aliphatic isocyanates such as butylene diisocyanate, hexamethylene diisocyanate, octamethylene diisocyanate, decamethylene diisocyanate, undodecamethylene diisocyanate, dodecamethylene diisocyanate, 4,4'-methylenebis(cyclohexyl isocyanate), isophorone diisocyanate, aromatic diisocyanates, such as tolyl diisocyanate, 4,4'-methylenebis(phenyl)isocyanate or polyisocyanates based on hexamethylene diisocyanate (HDI) selected from the group of HDI biuret, HDI uretdione, HDI isocyanurate and/or HDI allophanate.

Exemplary blocked isocyanate materials include caprolactam-blocked isocyanate materials, and the isocyanate materials can be butylene diisocyanate, hexamethylene diisocyanate, octamethylene diisocyanate, decamethylene diisocyanate, undodecamethylene diisocyanate, dodecamethylene diisocyanate, 4,4'-methylenebis(cyclohexyl isocyanate), isophorone diisocyanate, aromatic diisocyanates, such as tolyl diisocyanate, 4,4'-methylenebis(phenyl) isocyanate or polyisocyanates based on hexamethylene diisocyanate (HDI) selected from the group of HDI biuret, HDI uretdione, HDI isocyanurate and/or HDI allophanate, respectively.

In any of the embodiments described herein, one or both formulations, or any other formulation in the formulation system, comprises a catalyst for inducing anionic ring opening polymerization of the polyamide precursor.

In some of any of the embodiments described herein, the first formulation further comprises a catalyst for inducing anionic ROP of the polyamide precursor.

Any catalyst known in the art is usable in the context of these embodiments, including the exemplary catalysts sodium caprolactam and magnesium bromide caprolactam, which are also referred to herein and in the art as sodium caprolactamate and magnesium bromide caprolactamate, respectively.

Additional exemplary catalysts usable in polyamide forming formulation systems as described herein include, but are not limited to, alkali metal caprolactamates such as the above-mentioned sodium caprolactamate, as well as potassium caprolactamate; alkaline earth metal caprolactamates such as the above-mentioned bromide magnesium caprolactamate, chloride magnesium caprolactamate, and magnesium biscaprolactamate; alkali metal bases, for example sodium or sodium bases such as sodium hydride, sodium, sodium hydroxide, sodium methoxide, sodium ethoxide, sodium propoxide, sodium butoxide, for example potassium or potassium bases such as potassium hydride, potassium, potassium hydroxide, potassium methoxide, potassium ethoxide, potassium propoxide, potassium butoxide and mixtures thereof.

In some embodiments, the catalyst is sodium hydride, sodium, sodium caprolactamate and mixtures thereof.

In some of any of the embodiments described herein, at least one of the first and second model formulations further comprises a compound capable of increasing a rate of the polymerization (the anionic ROP) upon exposure to the curing energy.

In some of any of the embodiments described herein, the first model formulation further comprises a compound capable of increasing a rate of the polymerization upon exposure to the curing energy.

In some embodiments, such compounds are capable of activating the activator described herein, and thereby increase the rate of polymerization.

In some embodiments, such compounds are capable of activating an isocyanate material as described herein.

In some embodiments, such compounds are amine-containing compound, and are also referred to herein as "amine boosters".

The amine-containing compound can be an aliphatic or alicyclic, monomeric, oligomeric or polymeric compound featuring at least one primary, secondary and/or tertiary amine groups.

In some embodiments, the amine-containing compound is an aliphatic or alicyclic monomeric compound featuring at least one, preferably at least two, amine groups. Such a compound can be an alkyl, including a linear or branched alkyl, or a cycloalkyl or heteroalicyclic, which is substituted by one or more amine groups, as defined herein, or one or more amine-containing groups. Exemplary amine-containing groups include, but are not limited to, aminoalkyls and alkylaminoalkyls.

Exemplary amine-containing compounds include, but are not limited to, isophorone diamine, triethylenetetramine, Jeffamine® T-403, Jeffamine® T-3000, Jeffamine® T-5000, Polyetheramine T403, Polyetheramine T5000, PC Amine® TA 403, PC Amine® TA 5000, Epomin® SP-003, Epomin® SP-006, Lupasol® FG, Lupasol® PR8515, and Lupasol® WF.

In some embodiments, the amine-containing compound is a polyether amine.

A polyether amine is a compound having a polyether skeleton, for example, a polyethylene glycol skeleton, or a derivative thereof, which can be unsubstituted, or, preferably, substituted (e.g., alkyl substituted), and which is terminated or substituted by at least one, preferably at least two, amine groups or amine-containing groups as defined herein.

The polyether amine can be monofunctional, featuring one amine group, difunctional, featuring two amine groups, or multifunctional, featuring three or more amine groups. Each amine group can independently be primary, secondary and/or tertiary amine.

In some embodiments, the polyether amine is a polyether diamine. In some embodiments, the polyether amine can be an alkylpolyether amine.

The polyether amine can have a molecular weight in a range of, for example, from about 100 to about 10,000 grams/mol, or from about 100 to about 5,000 grams/mol, or from about 1,000 to about 5,000 grams/mol, or from about 2,000 to about 5,000 grams/mol.

In some embodiments, the amine-containing compound is a polyalkylene imine, for example, a polyethylene imine. Preferably, it is a hyperbranched polyalkylene imine such as hyperbranched polyethylene imine.

Polyalkylene imines, for example, polyethylene imines, can have an average molecular weight (weight average) in the range of from about 100 to about 3,000,000 grams/mol, or from about 500 to about 50,000 grams/mol, as determined, for example, via light scattering.

The polymers can have an amino functionality of primary and/or secondary amino groups in the range of from 10 to 70,000, for example, from 10 to 10,000, amino groups per chain, preferably in the range of from 20 to 500 amino groups per chain. Amino functionality can be determined from the distribution of the amino groups as is determinable, for example, by NMR measurements.

Polyalkylene imines can be homopolymers or copolymers. The homopolymers are generally obtainable by polymerization of ethyleneimine (aziridine) in aqueous or organic solution in the presence of acid-detaching compounds, acids or Lewis acids. Homopolymers of this type are branched polymers generally comprising primary, secondary and tertiary amino groups in a ratio of about 30%:40%:30%. This distribution of amino groups is generally determinable via $^{13}C$ NMR spectroscopy. The distribution is preferably in the range from 1:0.8:0.5 to 1:1.3:0.8.

Co-monomers used are preferably compounds having at least two amino functions. Useful co-monomers include for example alkylenediamines having 2 to 10 carbon atoms in the alkylene moiety, in which case ethylenediamine and propylenediamine are preferred. Useful co-monomers further include triamines such as diethylenetriamine, triethylenetetramine, tetraethylenepentamine, dipropylenetriamine, tripropylene-tetramine, dihexamethylenetriamine, aminopropylethylenediamine and bisamino-propylethylenediamine.

Useful polyethyleneimines further include crosslinked polyethyleneimines, which are obtainable by reaction of polyethyleneimines with bi- or polyfunctional crosslinkers having at least one halohydrin, glycidyl, aziridine or isocyanate unit, or at least one halogen atom, as functional group. Examples of such crosslinkers are epichlorohydrin or bischlorohydrin ethers of polyalkylene glycols having 2 to 100 ethylene oxide and/or propylene oxide units.

Polyethylene imines can further include amidated polymers typically obtainable by reaction of polyethyleneimines with carboxylic acids, carboxylic esters, carboxylic anhydrides, carboxamides or carbonyl halides; and/or alkoxylated polyethyleneimines obtainable for example by reaction of polyethyleneimines with ethylene oxide and/or propylene oxide; and/or hydroxyl-containing polyethyleneimines and amphoteric polyethyleneimines and/or lipophilic polyethyleneimines, generally obtained by incorporating long-chain hydrocarbon moieties in the polymer chain.

Suitable polyethylene imines are available under the Lupasol® brand (from BASF SE, Ludwigshafen), for example.

Some of the amine-containing compounds described herein, when included in one of the formulations described herein, may affect a mechanical property of the polyamide material, and hence of the modeling material (e.g., a polyamide-based material) formed of the modeling material formulations. For example, some of these compounds are also usable as toughening agent (or toughness modifiers), which improve Impact resistance and/or tensile strength. In some embodiments, these compounds are usable as impact modifying agents.

The term "toughening agent" as used herein encompasses an impact modifying agent (an impact modifier).

Inclusion of these compounds in one of the first and second formulations and selecting the ratio of the formulations, optionally at the voxel level, can therefore result in objects having different properties at different regions thereof, for example, at different voxel blocks, as described herein.

In some of any of the embodiments described herein, the activator is an isocyanate material which is or comprises a non-blocked polyisocyanate.

In some embodiments, the polyisocyanate material is or comprises an isocyanurate trimer of a diisocyanate, preferably, an isocyanurate trimer of hexamethylene diisocynate.

In some embodiments, it is an isocyanurate substituted by 3 isocyanate-terminated alkylenes (e.g., hexylenes, or hexamethylene).

In some of these embodiments, the method further comprises selecting an A:B ratio, as described herein, and in some of these embodiments, the ratio ranges from about 1.5:1 to about 5:1, and is preferably about 4:1.

In some of these embodiments, the compound which increases the polymerization rate is an aliphatic or alicyclic monomer compound featuring at least one amine group (e.g., isophorone diamine) and/or a polyether amine.

In some embodiments, the polyether amine is a multifunctional polyetheramine, and in some embodiments, it is high molecular weight, e.g., having a molecular weight of at least 1000 grams/mol, for example, from about 1,000 to about 5,000 or from about 2,000 to about 5,000, or from about 2,500 to about 5,000 grams/mol, multifunctional polyether amine.

In some of any of the embodiments described herein for an activator which is a non-blocked polyisocyanate, the first formulation further comprises a compound which increases the polymerization rate, and this compound is a multifunctional polyether amine having a molecular weight of at least 1000 grams/mol, and the method is effected by selecting an A:B weight ratio of about 4:1.

In some of any of the embodiments described herein for an activator which is a non-blocked polyisocyanate, a concentration of the compound which increases the polymerization rate ranges from 1 to 10, or from 2 to 8, or from 3 to 7, or is 5, weight percents of the total weight of the first model formulation.

In some of any of the embodiments described herein, the activator is an isocyanate material which is or comprises a lactam-blocked isocyanate material, preferably a caprolactam-blocked isocyanate material, more preferably a ε-caprolactam-blocked isocyanate material.

In some of any of the embodiments described herein, the activator is an isocyanate material which is or comprises a lactam-blocked isocyanate material, preferably a caprolactam-blocked isocyanate material, more preferably a ε-caprolactam-blocked isocyanate material, and in some of these embodiments, the lactam-blocked isocyanate material is or comprises a diisocyanate, preferably, a hexamethylene diisocynate.

In some of these embodiments, the first formulation further comprises a compound which increases the polymerization rate, as described herein, and in some embodiments, this compound is a polyalkylene imine, preferably a hyperbranched polyethylene imine, as described herein.

In some of these embodiments, the polyalkylene imine (e.g., the hyperbranched polyethylene imine) is a low molecular weight polymer, for example, having a molecular weight lower than 5000 grams/mol, or lower than 4000 grams/mol, or lower than 3000 grams/mol, or lower.

In some of these embodiments, a concentration of the compound which increases the polymerization rate ranges from about 1 to about 10, or from about 2 to about 8, or from about 3 to about 7, or is about 5, weight percents of the total weight of the first model formulation.

In some of any of the embodiments described herein, the isocyanate material is or comprises a lactam-blocked polyisocyanate. In some embodiments, it is a lactam-blocked, e.g., caprolactam-blocked, as described herein, tri-isocyanate. In some embodiments, the polyisocyanate material is or comprises an isocyanurate trimer of a diisocyanate, preferably, an isocyanurate trimer of hexamethylene diisocynate.

In some embodiments, it is an isocyanurate substituted by 3 isocyanate-terminated alkylenes (e.g., hexylenes, or hexamethylene). An exemplary such compound has been newly designed by the present inventors.

In some embodiments, this isocyanate material is or comprises a caprolactam-blocked polyisocyanate material, preferably an ε-caprolactam-blocked polyisocyanate material.

In some of these embodiments, the compound which increases the polymerization rate is a polyalkylene imine, preferably a hyperbranched polyethylene imine, more preferably a low molecular weight hyperbranched polyethylene imine, as described herein.

In some of any of the embodiments pertaining to a lactam-blocked polyisocyanate, a concentration of the compound which increases the polymerization rate ranges from about 1 to about 10, or from about 1 to about 5, or from about 2 to about 3, or is about 2.5, weight percents of the total weight of the first model formulation.

According to some of any of the embodiments described herein, a method as described herein is effected while using a modeling formulation system in which the first model formulation comprises a lactam and a catalyst for inducing anionic ring opening polymerization of the lactam, and the second model formulation comprises an activator for promoting the anionic ring opening polymerization of the lactam, which is a lactam-blocked polyisocyanate, as described herein.

In some of any of these embodiments, the first formulation further comprises an amine-containing compound as described herein in any of the respective embodiments, According to some of any of the embodiments described herein, a method as described herein is effected while using a modeling formulation system in which the first model formulation comprises a lactam and a catalyst for inducing anionic ring opening polymerization of the lactam, as described herein, and the second model formulation comprises an activator for promoting the anionic ring opening polymerization of the lactam, which is a caprolactam-blocked diisocyanate, as described herein.

In some of any of these embodiments, the first formulation further comprises an amine-containing compound as described herein in any of the respective embodiments.

According to some of any of the embodiments described herein, a method as described herein is effected while using a modeling formulation system in which the first model formulation comprises a lactam and a catalyst for inducing anionic ring opening polymerization of the lactam, as described herein, and the second model formulation comprises an activator for promoting the anionic ring opening polymerization of the lactam, which is a non-blocked polyisocyanate, as described herein, and while selecting an A:B weight ratio, as described herein, which ranges from 5:1 to 1.5:1, and is preferably 4:1.

In some of any of these embodiments, the first formulation further comprises an amine-containing compound as described herein in any of the respective embodiments, According to some of any of the embodiments described herein, the first model formulation is such that features a melting point lower than 68° C., or lower than 65° C., or lower than 62° C., or lower than 60° C.

Any of the first formulations described herein can feature such a melting point per se, or, alternatively, can further comprise a material which is capable of reducing the melting point of the formulation.

Such a material, and a concentration thereof in the first formulation, is selected so as to reduce the melting point of the formulation by at least 2° C., at least 5° C., at least 6° C., at least 7° C., at least 8° C., at least 9° C., at least 10° C., r at least 12° C., or at least 15° C., and up to, for example, 30° C.

Such a material can be a non-reactive material, which does not participate in the anionic ROP, or a reactive material, for example, a material which is polymerizable upon exposure to a thermal curing energy and/or in the presence of the components of the polyamide-forming system.

Exemplary such materials include, for example, an additional polyamide precursor, such as for example, laurolactam, or any other polyamide precursor having a melting point lower than that of the polyamide precursor used as a polyamide-forming material (e.g., caprolactam).

Additional exemplary materials include lactones, such as caprolactone, for example, ε-caprolactone. Additional, non-limiting examples of lactones include δ-valerolactone, γ-butyrolactone, ε-caprolactone, ω-pentadecalactone, cyclopentadecanone, 16-hexadecanolide, oxacyclotridecan-2-one. Preferably ε-caprolactone (e.g. Capa™ Monomer, Perstorp) and ω-pentadecalactone. (Macrolide® supra, Symrise). Any other materials are contemplated, as long as their melting point is lower than that of the selected polyamide precursor used as the main component for forming the polyamide-based material.

Additional exemplary materials include suitable amine-containing compounds as described herein, which are characterized by a melting point lower than that of the selected lactam (e.g., of caprolactam).

According to some of any of the embodiments described herein, a method as described herein is effected while using a modeling formulation system in which the first model formulation comprises a lactam and a catalyst for inducing anionic ring opening polymerization of the lactam, as described herein, and further comprises at least one material capable of reducing a melting point of the first model formulation, as described herein, and the second model formulation comprises an activator for promoting the anionic ring opening polymerization of the lactam, as described herein.

In some of any of the embodiments described herein, when such a material is added to the first formulation, at a suitable concentration, the first model formulation features a melting point lower than 68° C., or lower than 65° C., or lower than 62° C., or lower than 60° C.

Suitable concentrations of the material that reduces the melting point of the first formulation are from about 0.1 to about 50, or from about 0.5 to about 25, or from about 1 to about 10 or from about 3 to about 6, percent by weight of the total weight of the formulation containing same including any intermediate value and subranges therebetween.

In some of any of the embodiments described herein, a concentration of the activator in the second formulation ranges from about 5% to about 50% by weight of the total weight of the second formulation, preferably from 10% to 30%, or from 15% to 25%, by weight, including any intermediate value and subranges therebetween, unless otherwise indicated.

In some of any of the embodiments described herein for an activator which is a non-blocked polyisocyanate, a concentration of the activator in the second formulation ranges from 20% to 100%, or from 40% to 100%, or from 40% to 80%, by weight, of the total weight of the formulation containing same, including any intermediate value and subranges therebetween.

In some of any of the embodiments described herein, a concentration of the polyamide precursor in the first formulation ranges from about 10% to about 100% by weight of the total weight of the first formulation, preferably from 20% to 90%, or from 20% to 80%, or from 30 to 80%, or from 40 to 80%, by weight, of the total weight of the formulation comprising same, including any intermediate value and subranges therebetween, unless otherwise indicated.

In some of any of the embodiments described herein, a polyamide precursor as described herein is also included in the second formulation, optionally at a concentration that ranges from about 10% to about 90% by weight of the total weight of the first formulation, preferably from 10% to 80%, or from 10% to 70%, or from 10 to 60%, or from 10 to 50%, by weight, of the total weight of the formulation comprising same, including any intermediate value and subranges therebetween, unless otherwise indicated.

Herein throughout, whenever a first formulation is indicated, it is to be understood that it is a first modeling material formulation, as described herein, and is also referred to as a model A formulation.

Whenever a second formulation is indicated, it is to be understood that it is a second modeling material formulation, as described herein, and is also referred to as a model B formulation.

According to some of any of the embodiments described herein there is provided a two-part formulation system as described herein, which comprises a first formulation comprising a lactam or any other polyamide precursor and a catalyst for inducing anionic ring opening polymerization of the precursor, as described herein, and a second formulation comprising an activator for promoting the polymerization, and the activator is or comprises a lactam-blocked polyisocyanate, as described herein in any of the respective embodiments.

In such a formulation system, at least one of the first and second model formulations can further comprise a compound capable of increasing a rate of the polymerization upon exposure to curing energy, as described herein in any of the respective embodiments pertaining to a lactam-blocked polyisocyanate.

In some of these embodiments, a weight ratio of the first and second model formulations ranges from 9:1 to 1:9, respectively, as described herein for an A:B ratio, and in some embodiments, the weight ratio is 1:1.

According to some of any of the embodiments described herein there is provided a two-part formulation system as described herein, which comprises a first formulation comprising a lactam or any other polyamide precursor as described herein and a catalyst as described herein; and a second formulation comprising an activator for promoting the polymerization, and the activator is or comprises an isocyanate material, which can be blocked or non-blocked, as described herein, and is preferably a blocked diisocyanate material, as described herein in any of the respective embodiments.

In some of these embodiments, at least one of the first and second model formulations further comprises a compound capable of increasing a rate of the polymerization upon exposure to curing energy, as described herein in any of the respective embodiments and any combination thereof, for a blocked isocyanate material.

In some of these embodiments, a weight ratio of the first and second model formulations ranges from 9:1 to 1:9, respectively, as described herein for an A:B ratio, and in some embodiments, the weight ratio is 1:1.

According to some of any of the embodiments described herein there is provided a two-part formulation system as described herein, which comprises a first formulation comprising a lactam or any other polyamide precursor as described herein and a catalyst as described herein; and a second formulation comprising an activator for promoting the polymerization, and the activator is or comprises a non-blocked polyisocyanate, as described herein.

In some of these embodiments, a weight ratio of the first and second model formulations ranges from 1.5:1 to 5:1, respectively, or is about 4:1.

In some of these embodiments, the first model formulation further comprises a compound capable of increasing a rate of the polymerization upon exposure to the curing energy, as described herein in any of the respective embodiments pertaining to non-blocked polyisocyanate.

According to some of any of the embodiments described herein there is provided a two-part formulation system as described herein, which comprises a first formulation comprising a lactam or any other polyamide precursor as described herein and a catalyst as described herein; and a second formulation comprising an activator for promoting the polymerization, as described herein, preferably an isocyanate activator, and at least the first formulation features a melting point lower than the melting point of the polyamide precursor by at least 2° C., at least 5° C., at least 6° C., at least 7° C., at least 8° C., at least 9° C., at least 10° C., at least 12° C., at least 15° C. and up to 30° C.

In some of these embodiments, one or more the formulation, preferably the first formulation, comprises a material for reducing the melting point, as described herein, In some of these embodiments, the polyamide precursor is caprolactam, and the melting point of the first formulation is lower than 68° C., or lower than 65° C., or lower than 62° C., or lower than 60° C.

Any of the first and second model formulations as described herein can further comprise one or more additional agents which are chemically non-reactive (non-curable) and/or are chemically non-reactive with the polyamide-forming system or materials.

Such agents include, for example, toughening agent, surface active agents, stabilizers, antioxidants, pigments, dyes, and/or dispersants.

A surface-active agent may be used to reduce the surface tension of the formulation to the value required for jetting or for printing process, which is typically from about 10 to about 50 (e.g., 30) dyne/cm.

Suitable stabilizers (stabilizing agents) include, for example, thermal stabilizers, which stabilize the formulation at high temperatures.

The pigment may be a white pigment. The pigment may be an organic pigment or an inorganic pigment, or a metal pigment or a combination thereof.

Combinations of white pigments and dyes are usable for preparing colored cured materials.

The dye may be any of a broad class of solvent soluble dyes. Some non-limiting examples are azo dyes which are yellow, orange, brown and red; anthraquinone and triarylmethane dyes which are green and blue; and azine dye which is black.

Such agents can further affect a property of the polyamide polymeric material as described herein. Inclusion of these agents in one of the first and second compositions and controlling the ratio of the formulations, optionally at the voxel level, can therefore result in objects having different properties at different voxel blocks, as described herein.

In some of any of the embodiments described herein, one or more of the first and second formulations further comprises a toughening agent.

Non-limiting examples of toughening agents include elastomeric materials. Representative examples include, without limitation, natural rubber, butyl rubber, polyisoprene, polybutadiene, polyisobutylene, ethylene-propylene copolymer, styrene-butadiene-styrene triblock rubber, random styrene-butadiene rubber, styrene-isoprene-styrene triblock rubber, styrene-ethylene/butylene-styrene copolymer, styrene-ethylene/propylene-styrene copolymer, ethylene-propylene-diene terpolymers, ethylene-vinyl acetate and nitrile rubbers. Preferred agents are elastomers such as polybutadienes. Toughening agents such as elastomeric materials can be added by incorporating in one or more of the compositions an elastomeric material in a dispersed/dissolved phase.

In some of any of the embodiments described herein, one or more of the first and second formulations further comprises an impact modifying agent.

Exemplary such agents include impact modifying agents usable in the formation of polyamine (e.g., Nylon6) materials, as described herein.

Other impact modifying agents, such as, for example, carbon fibers, carbon nanotubes, glass fibers, aramid Keylar, polyparaphenylene benzobisoxazole Zylon, and other polar and non polar impact modifiers, are also contemplated.

Such agents can further affect a property of the polyamide polymeric material as described herein. Inclusion of these agents in one of the first and second formulations and controlling the ratio of the formulations, optionally at the voxel level, can therefore result in objects having different properties at different voxel blocks, as described herein.

In some of any of the embodiments described herein, an activator as described herein and/or any of the other materials included in the formulation systems described herein is selected capable of modifying a property of the polyamide polymeric material formed upon anionic ROP, namely upon exposure to a curing energy (e.g., heat), as described herein, and thereby a property of the modeling material, optionally at the voxel level. A property of the modeling material which is modified can be, for example, a mechanical property, a physical property or a chemical property.

Mechanical properties include, for example, elasticity, elongation at fracture, toughness, impact resistance at ambient temperature and/or at a low temperature, Shore hardness, heat deflection temperature (HDT), tear resistance, tensile strength, impact strength, flexural strength, creep resistance, and any additional mechanical property relevant to the formed modeling material, as would be readily recognized by those skilled in the art.

Physical properties which can be modified by the second material include, for example, optical activity, light absorbance or transmittance, conductivity, crystallinity, phase transition temperature (e.g., Tm), and any additional physical property relevant to the formed modeling material, as would be readily recognized by those skilled in the art.

Chemical properties which can be modified by the second material include, for example, hydrophobicity, hydrophilicity, chemical reactivity, solubility, adhesion, surface roughness, and any additional physical property relevant to the formed modeling material, as would be readily recognized by those skilled in the art.

In some of any of the embodiments described herein, selecting the ratio (e.g., an A:B weight ratio as described herein) between the first and second formulations determines the property of the modeling material formed by a selected ratio, optionally at the voxel level.

Herein throughout and in the art, the phrase "impact resistance", which is also referred to interchangeably, herein and in the art, as "impact strength" or simply as "impact", describes the resistance of a material to fracture by a mechanical impact, and is expressed in terms of the amount of energy absorbed by the material before complete fracture. Impact resistance can be measured using, for example, the ASTM D256-06 standard Izod impact testing (also known as "Izod notched impact", or as "Izod impact"), and is expressed as J/m.

Herein throughout and in the art, the phrase "heat deflection temperature", or HDT, describes the temperature at which a specimen of cured material deforms under a specified load. Determination of HDT can be performed using the procedure outlines in ASTM D648-06/D648-07.

In some of any of the embodiments described herein, the activator comprises a moiety that affects a property of the polyamide polymeric material.

Such a moiety can be, for example, an impact modifying moiety, an elastomeric chemical moiety, and optically-active chemical moiety, a light-absorbing chemical moiety, a hydrophobic chemical moiety, a hydrophilic chemical moiety and/or a reactive chemical moiety.

Moieties that may affect impact resistance (also referred to as impact modifying agents, or simply as impact modifiers) include, for example, elastomeric moieties, such as, but not limited to, a moiety derived from an elastomeric oligomer, polymer and/or copolymer, and/or any other moiety that forms, for example, block polymers or co-polymers, within the polymeric network.

Optically-active moieties include, for example, moieties that may rotate the plane of linearly polarized light about the direction of motion as the light travels therethrough.

Light-absorbing moieties include, for example, chromophore moieties, including dye moieties, fluorescent moieties, phosphorescent moieties, and the light.

Conductance modifying moieties, referred to herein also as conductive moieties, include, for example, conjugated moieties that allow charge transfer therethrough.

Metal chelating moieties include moieties that can form organometallic complexes with various metals or metal ions.

Hydrophobic moieties include hydrocarbon moieties, as described herein, containing more than 4 carbon atoms, preferably more than 6 carbon atoms, and more preferably more than 8 carbon atoms.

Hydrophilic moieties include, for example, hydrocarbons, as described herein, substituted by one, and preferably more, e.g., 2, 3, 4, 5, 6, 7, 8, 10, and even more, hydrophilic moieties such as hydroxyl, carboxylic acid, amine, and the like. The inclusion of hydrophilic moieties may affect the swelling properties of the building material (e.g., a modeling material or a support material).

Chemically-reactive moieties include, for example, moieties or groups that readily react with another moiety or compound to form a bond, as described herein. Such moieties allow for attaching an additional material to selected portions of a printed object.

Kits:

According to an aspect of some embodiments of the present invention there are provided kits comprising a formulation system as described herein in any of the respective embodiments packaged within the kit.

According to some embodiments the kits comprises a packaging material and a formulation system as described herein in any of the respective embodiments packaged within the packaging material.

According to some embodiments, each of the formulations within the kit (e.g., the first and second modeling formulations as described herein) is individually packaged within the kit.

According to some embodiments, the kit further comprises instructions to use the formulation system in 3D inkjet printing of a 3D object comprising a polyamide material. In some embodiments, the kit further comprises instructions to use the first and second formulations at a selected ratio, as described herein, and, in some embodiments, the kit further comprises instructions how to use the formulations (e.g., at which ratio of the first and second formulations) in order to obtain an object featuring a selected property as described herein in at least a part thereof. The instructions provided with the kit follow the embodiments described herein in any combination thereof.

The Object:

According to an aspect of some embodiments of the present invention there is provided an object, obtained by a method as described herein in any of the respective embodiments and any combination thereof.

In some embodiments, the object is characterized by at least one region in which exhibits a certain property or sets of properties, and another region which exhibits a different property or sets of properties. In some embodiments, the different property is a different degree of the same property or set of properties, for example, different impact resistance, different HDT, different stiffness, different elasticity, different chemical reactivity, etc.

In some embodiments, the object is characterized by at least one portion in which one voxel block exhibits a certain property or sets of properties, and another voxel block exhibits a different property or sets of properties. In some embodiments, the different property is a different degree of the same property or set of properties, for example, different impact resistance, different HDT, different stiffness, different elasticity, different chemical reactivity, etc.

In some embodiments, the object, or at least a portion thereof, comprises a polyamide-based material, as described herein.

In exemplary embodiments, different regions, optionally different voxels or voxel blocks, of the object, which comprise the polyamide-based material exhibit different properties, for example, different impact resistance, different elasticity, etc., as described herein.

In some embodiments, at least a portion of the object that is made of a polyamide-based material is characterized by:

HDT of at least 140° C., or of at least 155° C.; and/or Izod notched Impact of at least 60 J/m, or of at least 100 J/m or higher.

Polyamide materials with such high impact resistance, yet also high HDT, represent highly desirable properties of an object, let alone an object comprising a polyamide-based material.

In some embodiments, at least a portion of the object that is made of a polyamide-based material is characterized by a weight loss as defined herein lower than 20%, or lower than 10%, or lower than 5% or lower than 3%, or lower.

Figure 2:
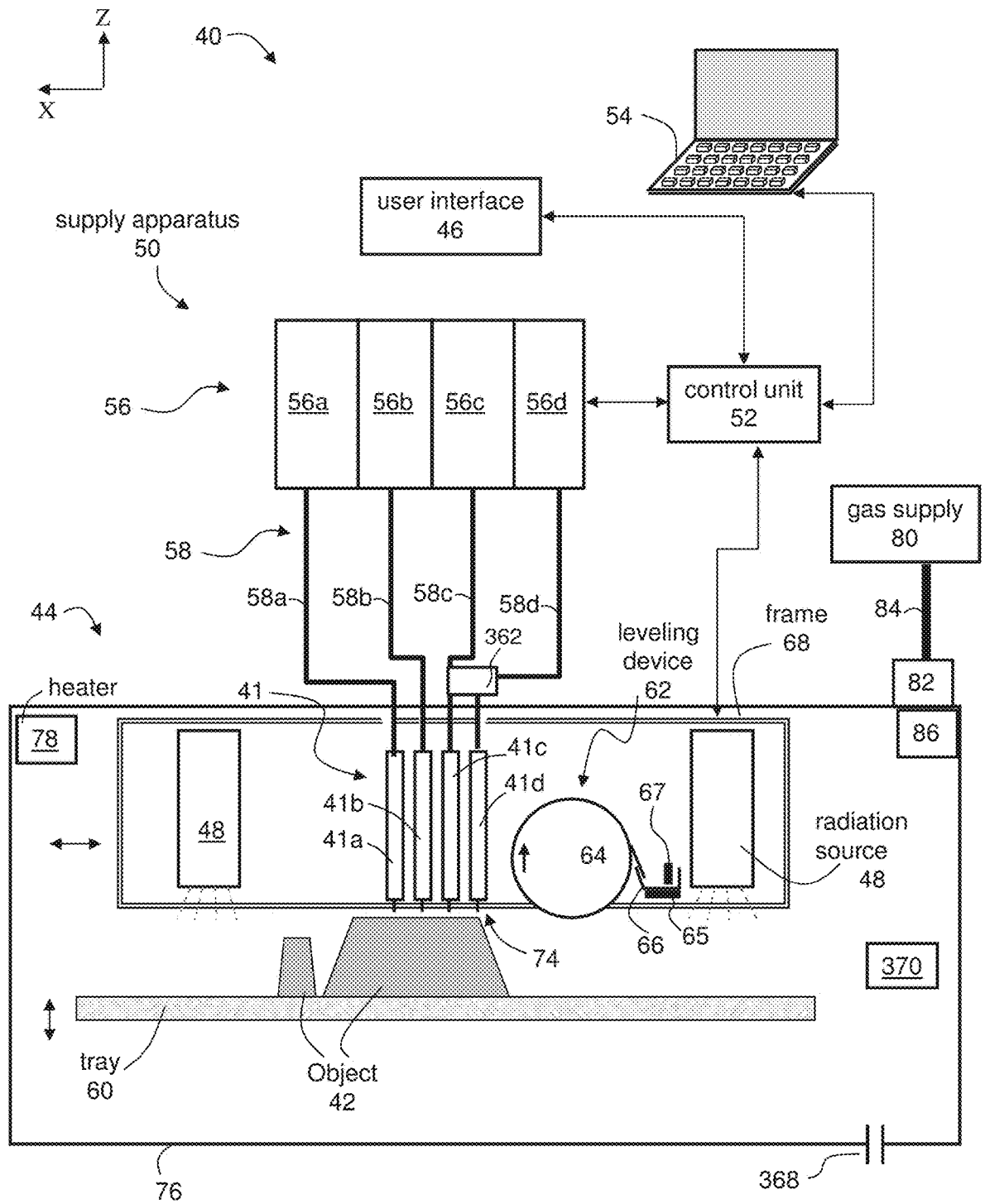
FIG. 2 is a schematic illustration of a three-dimensional printing system, according to some embodiments of the present invention.

The Printing System:

FIG. 2 is a schematic illustration of a three-dimensional printing system 40, according to some embodiments of the present invention. System 40 comprises a three-dimensional printing apparatus 44 having a printing block 41 which comprises a plurality of printing heads. Printing block 41 is typically placed within an enclosure 76 forming a printing chamber therein. Each head preferably comprises an array of one or more nozzles (not shown), through which a model formulation is dispensed. The model formulation is generally shown at 74, but it is to be understood that more than one model formulation is employed as further detailed hereinabove. In various exemplary embodiments of the invention each head dispenses one of the model formulations. If desired, two or more heads can dispense the same model formulation.

Each printing head is fed via a material reservoir which may optionally include a temperature control unit (e.g., a temperature sensor and/or a heating device), and a material level sensor. To dispense the model formulation(s), a voltage signal is applied to the printing heads to selectively deposit droplets of the respective model formulation via the printing head nozzles, for example, as in piezoelectric inkjet printing technology. The printing rate of each head depends on the number of nozzles, the type of nozzles and the applied voltage signal rate (frequency). Such printing heads are known to those skilled in the art of solid freeform fabrication.

In the example of FIG. 2, four printing heads 41a, 41b, 41c and 41d are illustrated. Each of heads 41a, 41b, 41c and 41d has a nozzle array. Heads 41a and 41b can be designated for the first and second model formulations, as further detailed hereinabove, and heads 41c and 41d can be designated for a support material. Thus, head 41a can deposit the first model formulation, head 41b can deposit the second model formulation and heads 41c and 41d can both deposit a support material. Alternatively, heads 41c and 41d, can be combined in a single head having more nozzles than each of heads 41a and 41b. The heads and nozzles are preferably made of materials selected capable to withstand passage of heated model formulations therethrough. In various exemplary embodiments of the invention the heads are configured for heating the materials contained therein.

Apparatus 44 can further comprise a curing system which can comprise one or more radiation sources 48, which can be, for example, an ultraviolet or visible or infrared or Xenon lamp, or other sources of electromagnetic radiation, or electron beam source, or ultrasound radiation source or microwave radiation source, depending on the materials being used. Radiation source 48 serves for curing or solidifying the materials, following their deposition. When the curing or solidifying is thermal, the components of the system may be exposed to elevated temperatures. Thus, the components of system 40 (particularly the printing heads, but also any other component) are preferably made of materials that sustain thermal curing temperatures. The present embodiments also contemplate configuration in which two different radiation sources apply different types of curing energies, as further detailed hereinabove.

The printing heads and radiation source or sources can be mounted in a frame or block 68 which is preferably operative to reciprocally move over a tray 60, which serves as the working surface. The radiation sources can be mounted in the block such that they follow in the wake of the printing heads to at least partially cure or solidify the materials just deposited by the printing heads. According to the common conventions, tray 60 is positioned in the X-Y plane. Tray 60 is typically configured to move vertically (along the Z direction), e.g., downward. Apparatus 44 can further comprise one or more leveling devices 62, e.g., a roller 64. Leveling device 62 serves to straighten, level and/or establish a thickness of the newly formed layer prior to the formation of the successive layer thereon. Leveling device 62 can comprise a waste collection device 66 for collecting the excess material generated during leveling. Waste collection device 66 may comprise any mechanism that delivers the material to a waste tank or waste cartridge. In various exemplary embodiments of the invention waste collection device 66 is constituted to handle reactive mixtures. This can be done in more than one way. In some embodiments, the model formulations react within waste collection device 66 after they are removed from the deposited layer. In these embodiments, waste collection device 66 comprises a grinding device 67 that mechanically breaks the reaction product of the model formulations into sufficiently small debris to allow them to be removed easily. Grinding device 67 can be in the form of a rotating blade, a shaker, an ultrasound source or the like. In some embodiments of the present invention waste collection device 66 is maintained at a reduced temperature such as to reduce the reaction rate, thereby allowing the model formulations to be removed before the reaction is completed. This can be achieved, for example, using a heat pump 65 mounted on device 66.

System 40 preferably comprises a heater 76 that maintains an elevated temperature within the printing chamber enclosed by enclosure 76. The temperature within the enclosure is above the melting point of the dispensed model formulations so as to maintain them in liquid form, thereby allowing them to be dispensed from the heads of block 41, yet sufficiently low so as to prevent the first and second model formulation from spontaneously reacting or curing before they are leveled by device 62 and to facilitate waste collection. For example when caprolactam is employed, heater 78 heats the printing chamber to a temperature of about 80° C. In some embodiments, leveling device 62 is heated, for example, by a heater (not shown) mounted on or integrally formed in device 62. These embodiments are particularly useful for model formulations which tend to solidify or partially solidify immediately after they are dispensed. In these cases, a heated device 62 is advantageous since it liquefies or further liquefies the just deposited model formulations thereby facilitating easier straightening and waste removal.

System 40 may also comprises a gas inlet 82 port, mounted on enclosure 76 and constituted to allow entry of gas, such as an inert gas or inert gas mixture as further detailed hereinabove, into the printing chamber. The gas can be provided to inlet 82 through a gas supply conduit 84 connected to a gas supply system 80, both of which can optionally and preferably also be part of system 40. In some embodiments, gas supply system 80 heats the gas prior to the delivery of the gas to inlet 82 port. Alternatively or additionally, a gas heater 86 can be placed in proximity to inlet port 82, so as to heat the gas upon entry into the printing chamber. Preferably the gas is heated to the same temperature that is maintained by heater 78.

Optionally, the printing chamber 76 is also formed with a gas outlet 368 for allowing the gas to exit the chamber if desired. Both inlet 82 and outlet 368 are of the present embodiments provided with valves (not shown) so as to controllably allow entry and/or exit of the gas to and from the chamber. Preferably, controller 52 generates, continuously or intermittently, inflow and outflow of the inert gas through the gas inlet and the gas outlet. This can be achieved by configuring controller 52 to control at least one of supply 80, inlet 82 and outlet 368. Optionally, system 40 comprises a gas flow generating device 370, placed within the chamber 76 and configured for generating a flow of the inert gas within the chamber. Device 370 can be a fan or a blower. Controller 52 can be configured for controlling also device 370, for example, based on a predetermined printing protocol.

In some embodiments of the present invention apparatus 44 comprises a mixing chamber 362 for preparing the modeling material formulation prior to entry of the modeling material formulation into a respective head. In the schematic illustration of FIG. 2, which is not to be considered as limiting, chamber 362 receives materials from different containers, mixes the received materials and introduces the mix to two heads (heads 41c and 41d, in the present example). However, this need not necessarily be the case since in some embodiments chamber 362 can receive materials from different containers, mixes the received materials and introduces the mix only to more than two heads of only to one head. Preferably, the position and fluid communication between mixing chamber 362 and respective head is selected such that at least 80% or at least 85% or at least 90% or at least 95% or at least 99% or the modeling material formulation that enters the respective head or heads (e.g., heads 41c and 41d in the present example) remains uncured. For example, chamber 362 can be attached directly to the printing head or the printing block, such that motion of the printing head is accompanied by motion of the mixing chamber. These embodiments are particularly useful when the formulation undergoes fast polymerization reaction even in the absence of curing radiation.

In operation, the printing heads of printing block 41 move in a scanning direction, which is referred to herein as the X direction, and selectively deposit material in a predetermined configuration in the course of their passage over tray 60. The material typically comprises two or more model formulations as further detailed hereinabove and one or more types of support material. The passage of the printing heads of printing block 41 is followed by the curing of the deposited material(s) by radiation source 48. In the reverse passage of the heads, back to their starting point for the layer just deposited, an additional deposition of material(s) may be carried out, according to a predetermined configuration. In the forward and/or reverse passages of the printing heads, the layer thus formed may be straightened by leveling device 62, which can follow in the path of the printing heads in their forward and/or reverse movement. Once the printing heads return to their starting point along the X direction, they may move to another position along an indexing direction, referred to herein as the Y direction, and continue to build the same layer by reciprocal movement along the X direction. Alternately, the printing heads may move in the Y direction between forward and reverse movements or after more than one forward-reverse movement. The series of scans performed by the printing heads to complete a single layer is referred to herein as a single scan cycle.

Once the layer is completed, tray 60 is lowered in the Z direction to a predetermined Z level, according to the desired thickness of the layer subsequently to be printed. The procedure is repeated to form three-dimensional object 42 in a layerwise manner.

Tray 60 can alternatively or additionally be displaced in the Z direction between forward and reverse passages of the printing head of printing block 41, within the layer. Such Z displacement may be carried out for example in order to cause contact of the leveling device with the surface in one direction and prevent contact in the other direction.

System 40 also comprises a material supply apparatus 50 which comprises the material containers or cartridges and supplies a plurality of materials to fabrication apparatus 44, via a respective plurality of supply ducts 58. In the illustration of FIG. 2, four supply containers 56a, 56b, 56c and 56d, and four supply ducts 58a, 58b, 58c and 58d are shown, for providing materials to heads 41a, 41b, 41c and 41d, respectively.

A controller 52 includes an electronic circuit that controls fabrication apparatus 44 and supply apparatus 50. The electronic circuit of controller 52 can communicate with a computer or data processor 54 which transmits digital data pertaining to fabrication instructions based on computer object data stored on a computer readable medium, preferably a non-transitory medium, in a form of a Standard Tessellation Language (STL) format or any other format such as, but not limited to, at the aforementioned formats. Typically, the circuit of controller 52 controls the voltage applied to each printing head or nozzle array and the temperature of the material in the respective printing head.

Once the manufacturing data is loaded to controller 52 it can operate without user intervention. Controller 52 may, however, receive additional input from the operator, e.g., using data processor 54 or using a user interface 46 communicating with unit 52. User interface 46 can be of any type known in the art, such as, but not limited to, a keyboard, a touch screen and the like. For example, controller 52 can receive, as additional input, one or more material types and/or attributes, such as, but not limited to, color, characteristic distortion and/or transition temperature, viscosity, electrical property, magnetic property. Other attributes and groups of attributes are also contemplated. Controller 52 can also receive a ratio between the first model formulation and the second model formulation, as further detailed hereinabove. The ratio can be received via user interface 46 or data processor 54. Data processor can also calculated the ratio based on the desired properties of object 42 and then transmit the ratio to controller 52.

In some embodiments of the present invention radiation source(s) 48 are also controlled by controller 52. For example, controller 52 can activate and deactivate radiation source(s) 48 according to a predetermined printing protocol. When system 40 comprises two different radiation sources that apply different types of curing energies, controller 52 preferably controls each of these radiation sources separately. For example, controller 52 can signal a first radiation source to deliver a first type of curing energy (e.g., in the form of UV radiation), and a second radiation source to deliver a second type of curing energy (e.g., thermal energy), such that the two types of curing energies are delivered according to a predetermined curing scenario sequentially, simultaneously or intermittently. In any of these curing scenarios, controller 52 can also signal the radiation source(s) to deliver the energy repeatedly.

System 40 can fabricate an object by depositing different materials from different printing heads. In various exemplary embodiments of the invention the electronic circuit of controller 52 is configured to form voxel blocks, wherein, for each block, a ratio between a number of voxels of the first model formulation in the block and a number of voxels of the second model formulation in the block corresponds to the selected ratio received from data processor 54 or user interface 46.

The system of present embodiments provides the ability to select materials from a given number of materials and define desired combinations of the selected materials and their properties. The spatial locations of the deposition of each material with the layer are defined, either to effect occupation of different three-dimensional spatial locations by different materials, or to effect occupation of substantially the same three-dimensional location or adjacent three-dimensional locations by two or more different materials so as to allow post-deposition spatial combination of the materials within the layer.

It is expected that during the life of a patent maturing from this application many relevant components of a polyamide-forming system as described herein will be developed and the scope of the terms polyamide precursor, catalyst, and activator, is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "amine" describes both a —NRxRy group and a —NRx-group, wherein Rx and Ry are each independently hydrogen, alkyl, cycloalkyl, aryl, as these terms are defined hereinbelow.

The amine group can therefore be a primary amine, where both Rx and Ry are hydrogen, a secondary amine, where Rx is hydrogen and Ry is alkyl, cycloalkyl or aryl, or a tertiary amine, where each of Rx and Ry is independently alkyl, cycloalkyl or aryl.

Alternatively, Rx and Ry can each independently be hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, carbonyl, C-carboxylate, O-carboxylate, N-thiocarbamate, O-thiocarbamate, urea, thiourea, N-carbamate, O-carbamate, C-amide, N-amide, guanyl, guanidine and hydrazine.

An amine end group can be a primary amine, in case both Rx and Ry are hydrogen, or secondary, when one of Rx and Ry is other than hydrogen (e.g., alkyl, cycloalkyl, aryl, alkenyl, and the like), or tertiary, in case each of Rx and Ry is other than hydrogen.

An amine linking group is a secondary amine when Rx is hydrogen, and is a tertiary amine when Rx is other than hydrogen.

The term "alkyl" describes a saturated aliphatic hydrocarbon including straight chain and branched chain groups. Preferably, the alkyl group has 1 to 20 carbon atoms. Whenever a numerical range; e.g., "1-20", is stated herein, it implies that the group, in this case the alkyl group, may contain 1 carbon atom, 2 carbon atoms, 3 carbon atoms, etc., up to and including 20 carbon atoms. More preferably, the alkyl is a medium size alkyl having 1 to 10 carbon atoms. Most preferably, unless otherwise indicated, the alkyl is a lower alkyl having 1 to 6 carbon atoms (C(1-6) alkyl). The alkyl group may be substituted or unsubstituted. Substituted alkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine.

The alkyl group can be an end group, as this phrase is defined hereinabove, wherein it is attached to a single adjacent atom, or a linking group, as this phrase is defined hereinabove, which connects two or more moieties via at least two carbons in its chain. When the alkyl is a linking group, it is also referred to herein as "alkylene" or "alkylene chain".

Alkene and alkyne, as used herein, are an alkyl, as defined herein, which contains one or more double bond or triple bond, respectively.

The term "cycloalkyl" describes an all-carbon monocyclic ring or fused rings (i.e., rings which share an adjacent pair of carbon atoms) group where one or more of the rings does not have a completely conjugated pi-electron system. Examples include, without limitation, cyclohexane, adamantine, norbornyl, isobornyl, and the like. The cycloalkyl group may be substituted or unsubstituted. Substituted cycloalkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The cycloalkyl group can be an end group, as this phrase is defined hereinabove, wherein it is attached to a single adjacent atom, or a linking group, as this phrase is defined hereinabove, connecting two or more moieties at two or more positions thereof.

The term "heteroalicyclic" describes a monocyclic or fused ring group having in the ring(s) one or more atoms such as nitrogen, oxygen and sulfur. The rings may also have one or more double bonds. However, the rings do not have a completely conjugated pi-electron system. Representative examples are piperidine, piperazine, tetrahydrofurane, tetrahydropyrane, morpholino, oxalidine, and the like. The heteroalicyclic may be substituted or unsubstituted. Substituted heteroalicyclic may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroalicyclic group can be an end group, as this phrase is defined hereinabove, where it is attached to a single adjacent atom, or a linking group, as this phrase is defined hereinabove, connecting two or more moieties at two or more positions thereof.

The term "aryl" describes an all-carbon monocyclic or fused-ring polycyclic (i.e., rings which share adjacent pairs of carbon atoms) groups having a completely conjugated pi-electron system. The aryl group may be substituted or unsubstituted. Substituted aryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The aryl group can be an end group, as this term is defined hereinabove, wherein it is attached to a single adjacent atom, or a linking group, as this term is defined hereinabove, connecting two or more moieties at two or more positions thereof.

The term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Examples, without limitation, of heteroaryl groups include pyrrole, furan, thiophene, imidazole, oxazole, thiazole, pyrazole, pyridine, pyrimidine, quinoline, isoquinoline and purine. The heteroaryl group may be substituted or unsubstituted. Substituted heteroaryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroaryl group can be an end group, as this phrase is defined hereinabove, where it is attached to a single adjacent atom, or a linking group, as this phrase is defined hereinabove, connecting two or more moieties at two or more positions thereof. Representative examples are pyridine, pyrrole, oxazole, indole, purine and the like.

The term "hydroxyl" describes a —OH group.

The term "alkoxy" describes both an —O-alkyl and an —O-cycloalkyl group, as defined herein.

The term "aryloxy" describes both an —O-aryl and an —O-heteroaryl group, as defined herein.

The term "thiohydroxy" describes a —SH group.

The term "thioalkoxy" describes both a —S-alkyl group, and a —S-cycloalkyl group, as defined herein.

The term "thioaryloxy" describes both a —S-aryl and a —S-heteroaryl group, as defined herein.

The "hydroxyalkyl" is also referred to herein as "alcohol", and describes an alkyl, as defined herein, substituted by a hydroxy group. In some embodiments, the alkyl is substituted by hydroxy at a distal position with respect to its attachment point.

The term "cyano" describes a —≡N group.

The term "isocyanate" describes an —N=C=O group.

The term "isothiocyanate" describes an —N=C=S group.

The term "nitro" describes an —NO$_2$ group.

The term "carboxylate" as used herein encompasses C-carboxylate and O-carboxylate.

The term "C-carboxylate" describes a —C(=O)—ORx end group or a —C(=O)—O-linking group, as these phrases are defined hereinabove, where Rx is as defined herein. The term "O-carboxylate" describes a —OC(=O)Rx end group or a —OC(=O)-linking group, as these phrases are defined hereinabove, where Rx is as defined herein.

A carboxylate can be linear or cyclic. When cyclic, Rx and the carbon atom are linked together to form a ring, in C-carboxylate, and this group is also referred to as lactone. Alternatively, Rx and O are linked together to form a ring in O-carboxylate. Cyclic carboxylates can function as a linking group, for example, when an atom in the formed ring is linked to another group.

The term "thiocarboxylate" as used herein encompasses C-thiocarboxylate and O-thiocarboxylate.

The term "C-thiocarboxylate" describes a —C(=S)—ORx end group or a —C(=S)—O-linking group, as these phrases are defined hereinabove, where Rx is as defined herein.

The term "O-thiocarboxylate" describes a —OC(=S)Rx end group or a —OC(=S)-linking group, as these phrases are defined hereinabove, where Rx is as defined herein.

A thiocarboxylate can be linear or cyclic. When cyclic, Rx and the carbon atom are linked together to form a ring, in C-thiocarboxylate, and this group is also referred to as thiolactone. Alternatively, Rx and O are linked together to form a ring in O-thiocarboxylate. Cyclic thiocarboxylates can function as a linking group, for example, when an atom in the formed ring is linked to another group.

The term "carbamate" as used herein encompasses N-carbamate and O-carbamate.

The term "N-carbamate" describes an RyOC(=O)—NRx-end group or a —OC(=O)—NRx-linking group, as these phrases are defined hereinabove, with Rx and Ry as defined herein.

The term "O-carbamate" describes an —OC(=O)—NRxRy end group or an —OC(=O)—NRx-linking group, as these phrases are defined hereinabove, with Rx and Ry as defined herein.

A carbamate can be linear or cyclic. When cyclic, Rx and the carbon atom are linked together to form a ring, in O-carbamate. Alternatively, Rx and O are linked together to form a ring in N-carbamate. Cyclic carbamates can function as a linking group, for example, when an atom in the formed ring is linked to another group.

The term "carbamate" as used herein encompasses N-carbamate and O-carbamate.

The term "thiocarbamate" as used herein encompasses N-thiocarbamate and O-thiocarbamate.

The term "O-thiocarbamate" describes a —OC(=S)—NRxRy end group or a —OC(=S)—NRx-linking group, as these phrases are defined hereinabove, with Rx and Ry as defined herein.

The term "N-thiocarbamate" describes an RyOC(=S)NRx-end group or a —OC(=S)NRx-linking group, as these phrases are defined hereinabove, with Rx and Ry as defined herein.

Thiocarbamates can be linear or cyclic, as described herein for carbamates.

The term "dithiocarbamate" as used herein encompasses S-dithiocarbamate and N-dithiocarbamate.

The term "S-dithiocarbamate" describes a —SC(=S)—NRxRy end group or a —SC(=S)NRx-linking group, as these phrases are defined hereinabove, with Rx and Ry as defined herein.

The term "N-dithiocarbamate" describes an RySC(=S)NRx-end group or a —SC(=S)NRx-linking group, as these phrases are defined hereinabove, with Rx and Ry as defined herein.

The term "urea", which is also referred to herein as "ureido", describes a —NRxC(=O)—NRyRq end group or a —NRxC(=O)—NRy-linking group, as these phrases are defined hereinabove, where Rz and Ry are as defined herein and Rq is as defined herein for Rx and Ry.

The term "thiourea", which is also referred to herein as "thioureido", describes a —NRx-C(=S)—NRyRq end group or a —NRx-C(=S)—NRy-linking group, with Rx, Ry and Rq as defined herein.

The term "amide" as used herein encompasses C-amide and N-amide.

The term "C-amide" describes a —C(=O)—NRxRy end group or a —C(=O)—NRx-linking group, as these phrases are defined hereinabove, where Rx and Ry are as defined herein.

The term "N-amide" describes a RxC(=O)—NRy-end group or a RxC(=O)—N—linking group, as these phrases are defined hereinabove, where Rx and Ry are as defined herein.

An amide can be linear or cyclic. When cyclic, Rx and the carbon atom are linked together to form a ring, in C-amide, and this group is also referred to as lactam. Cyclic amides can function as a linking group, for example, when an atom in the formed ring is linked to another group.

Herein, the term "hydrocarbon" describes an organic moiety that includes, as its basic skeleton, a chain of carbon atoms, also referred to herein as a backbone chain, substituted mainly by hydrogen atoms. The hydrocarbon can be saturated or unsaturated, linear or branched, and can be comprised of aliphatic, alicyclic and/or aromatic moieties, and can optionally be substituted by one or more substituents (other than hydrogen).

The hydrocarbon moiety can optionally be interrupted by one or more heteroatoms, including, without limitation, one or more oxygen, nitrogen and/or sulfur atoms.

The number of carbon atoms in a hydrocarbon moiety can range from 2 to 20, and is preferably lower, e.g., from 1 to 10, or from 1 to 6, or from 1 to 4. A hydrocarbon can be a linking group or an end group.

In some embodiments of any of the embodiments described herein relating to a hydrocarbon, the hydrocarbon is not interrupted by any heteroatom, nor does it comprise heteroatoms in its backbone chain, and can be an alkylene chain, or be comprised of alkyls, cycloalkyls, aryls, alkaryls, aralkyls, alkenes and/or alkynes, as defined herein, covalently attached to one another in any order.

In some of these embodiments, the hydrocarbon is an alkylene chain.

The term "alkylene" describes a saturated aliphatic hydrocarbon group, as this term is defined herein. This term is also referred to herein as "alkyl".

The alkylene can be substituted or unsubstituted, as defined herein for alkyl.

In some embodiments, when a hydrocarbon as described herein is interrupted by one or more heteroatoms, the hydrocarbon can comprises one or more alkylene glycol groups (units).

As used herein, the term "alkylene glycol" describes a —[(CRxRy)$_z$-O]$_y$-Rq end group or a —[(CRxRy)$_z$-O]$_y$—linking group, with Rx, Ry and Rq being as defined herein, and with z being an integer of from 1 to 10, preferably, 2-6, more preferably 2 or 3, and y being an integer of 1 or more. Preferably Rx and Ry are both hydrogen. When z is 2 and y is 1, this group is ethylene glycol. When z is 3 and y is 1, this group is propylene glycol.

When y is greater than 4, the alkylene glycol is referred to herein as poly(alkylene glycol). In some embodiments of the present invention, a poly(alkylene glycol) group or moiety can have from 1 to 20 repeating alkylene glycol units, such that z is 1 to 20, preferably 1-10, more preferably 1-8, or as further defined hereinabove.

Alkyene glycol derivatives, and poly(alkylene glycol) derivatives include, for example, compounds in which one or more of Rx and Ry is other than hydrogen and/or one or more of the oxygen atoms is replaced by, for example, S or NRx.

In some embodiments, a hydrocarbon moiety as described herein is a poly(alkylene glycol) moiety.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Materials and Experimental Methods

Materials:

Table 2 below presents the materials used in the exemplary experiments conducted.

TABLE 2

| Compound | Function | Trade name/Chemical Composition | Source |
|---|---|---|---|
| ε-CL | Curable monomer | AP-NYLON ® Caprolactam | Brüggemann KG |
| ε-CLE | Curable monomer/ Impact modifier | ε-caprolactone; Capa ™ Monomer | Perstorp |
| C10 | Curable Monomer + catalyst | BRUGGOLEN ® C10 (about 17-18% of NaCL in ε-CL) | Brüggemann KG |
| C20 | Curable Monomer + activator | Bruggolen ® C20P (about 80% of ε-CL blocked HDI in ε-CL) | Brüggemann KG |
| BruggolenTP C-1312 | Activator | Bruggolen TP C-1312 (PPG/PEG based high molecular weight ε-CL blocked isocyanate macroactivator) | Brüggemann KG |
| LL | Curable monomer | Laurolactam (12-Aminododecanolactam, 98%) | Sigma-Aldrich |
| PDL | Curable monomer/ Impact modifier | ω-Pentadecalactone, ≥98% | Sigma-Aldrich |
| PEI FG | Impact modifier/ amine booster | Lupasol ® FG (polyethyleneimine, about 800 g/mol, 99%) | BASF |
| PEI PR8515 | Impact modifier/ amine booster | Lupasol ® PR8515 (polyethyleneimine, about 2000 g/mol, 99%) | BASF |
| PEI WF | Impact modifier/ amine booster | Lupasol ® WF (polyethyleneimine, about 25000 g/mol, 99%) | BASF |
| N3900 | Activator | Desmodur N 3900 (asymmetric isocyanurate trimer of hexamethylene diisocyanate) | Bayer |
| BL-N3900 | activator | ε-Caprolactam blocked Desmodur N 3900 | Synthetically prepared by the present inventors* |
| IDA | Impact modifier/ amine booster | Baxxodur ® EC 201 (Isophorone diamine) | BASF |

TABLE 2-continued

| Compound | Function | Trade name/Chemical Composition | Source |
|---|---|---|---|
| T-403 | Impact modifier/ amine booster | Baxxodur ® EC 310 (Trifunctional polyether amine, $M_w$ about 440 g/mol) | BASF |
| C540 | Impact modifier/ amine booster | Bruggolen ® C540 (Trifunctional polyether amine, $M_w$ about 5000 g/mol) | Brüggemann KG |

*see below general synthesis procedure

Preparation of ε-Caprolactam Blocked Desmodur N3900 (BL-N3900):

The subject modified activator is generally prepared as follows:

50 grams of AP-NYLON® Caprolactam (Bruggemann Chemie) and 50 grams of Desmodur N 3900 (Bayer AG) are added into a glass bottle containing a magnetic stirrer. The bottle is tightly sealed and the mixture is subjected to vigorous magnetic stirring and heated to 85-95° C. for 6 hours. Completion of the block reaction can be determined by viscosity measurements, wherein no further change in viscosity is indicative of reaction completion.

The reaction product is a highly viscous liquid, which does not crystallize at room temperature.

Methods:

All experiments were performed using two-part model formulation systems, comprising a set of polyamide-forming materials divided into two formulations.

Generally, the Model A formulation in the formulation system (the first model formulation) comprises at least one caprolactam monomer, and a catalyst, and may further comprise one or more impact modifier(s) and/or amine boosters, and optionally one or more additional thermally-curable monomers (e.g., a laurolactam and/or a caprolactone. Model B formulation (the second model formulation) in the formulation system comprises an activator and may further comprise one or more impact modifier(s) and/or amine booster(s), and/or and one or more additional thermally-curable monomers (e.g., lactone(s)).

Herein, the term "amine booster" refers to an amine-containing compound which increases the polymerization rate, as described herein, presumably by activating the activator. Some amine boosters are also known and referred to in the art as Impact modifiers.

In some embodiments, a lactone is included in a formulation which is devoid of a catalyst (e.g., the second, Model B, formulation).

In some embodiments, the amine booster is included in a formulation that is devoid of an activator or is devoid of a lactone (e.g., the first, Model A formulation).

Molds:

Mold experiments were conducted by mixing Model A formulation and Model B formulation at the indicated weight ratio in a mold having a thickness 3.2 mm, a of length 127 mm, and a width 12.7 mm. For example, the total weight ratio of Model A and Model B formulations was 100 grams [weight ratio=50:50].

Mold experiments are indicative of an effect of different ratios of the first and second formulations, and are used to predict an effect of a selected ratio of the formulations on a property of the modeling material and/or on the kinetic parameters of the curing.

3D Inkjet Printing:

Three-dimensional inkjet printing of polyamide-producing formulations was performed on a Connex® 500 by dual jetting: Model formulation A (Model A) was jetted by inkjet head A (or a series of inkjet heads A) and Model formulation B (Model B) was jetted by inkjet head B (or a series of inkjet heads B).

The inkjet temperature was 65-110° C., typically 70-90° C. Jetting at this temperature range was found suitable for having the caprolactam-containing and/or activator-containing formulations being in a liquid form and featuring the required viscosity.

The materials were jetted on a heated tray, simultaneously, and were subsequently heated by an IR or Halogen lamp or ceramic lamp, at a temperature above 130° C., optionally above 200 or 300° C. so as to effect a polymerization.

Mechanical Properties:

HDT was measured using HDT 3 VICAT (CEAST, Italy).

Izod Impact was measured by RESIL 5.5J (CEAST, Italy).

DMA measurements indicate the temperature at which storage modulus decreases by 50%. This value is indicative of the stiffness degree of the material. Decrease of storage modulus at a high temperature indicates a stiff material and at a low temperature it indicates weak material.

DMA measurements were performed using DMA Q800 measurement device (TA Instruments (Belgium)).

Example 1

Model Formulation Modifications

The present inventors have designed various polyamide-forming model formulation systems and have studied the effect of the components therein on the properties of the obtained cured polyamide materials and with respect to their compatibility with 3D inkjet printing systems.

In one set of experiments, performed in mold, for each tested formulation, the Model A formulation part and the Model B formulation part were used at a 1:1 (50:50) weight ratio.

Tables 3A and 3B below present the components included in the various formulation systems (a)-(k) tested in this set of experiments, with Table 3A presenting the components of the Model A formulation (first model formulation) in each formulation system and Table 3B presented the components of the Model B formulation (the second model formulation) in each formulation system.

TABLE 3A

| | (Model A) | | | | | | | | | | |
|---|---|---|---|---|---|---|---|---|---|---|---|
| Component | (a) | (b) | (c) | (d) | (e) | (f) | (g) | (h) | (i) | (j) | (k) |
| C10 | 7.5 | 50 | 50 | 50 | 50 | 50 | 50 | 50 | 25 | 25 | 25 |
| ε-CL | 92.5 | 50 | 45 | 45 | 45 | 45 | 45 | 45 | 72.5 | 72.5 | 62.5 |
| LL | | | | | | | | | | | 10 |
| IDA | | | 5 | | | | | | | | |
| T-403 | | | | 5 | | | | | | | |
| C540 | | | | | 5 | | | | | | |
| PEI FG | | | | | | 5 | | | 2.5 | 2.5 | 2.5 |
| PEI PR 8515 | | | | | | | 5 | | | | |
| PEI WF | | | | | | | | 5 | | | |

TABLE 3B

| | (Model B) | | | | | | | | | | |
|---|---|---|---|---|---|---|---|---|---|---|---|
| Component | (a) | (b) | (c) | (d) | (e) | (f) | (g) | (h) | (i) | (j) | (k) |
| C20 | 5.2 | 34.7 | 34.7 | 34.7 | 34.7 | 34.7 | 34.7 | 34.7 | | | |
| ε-CL | 92.5 | 65.3 | 65.3 | 65.3 | 65.3 | 65.3 | 65.3 | 65.3 | 30 | 30 | 30 |
| ε-CLE | | | | | | | | | 50 | | 50 |
| PDL | | | | | | | | | | 50 | |
| BL-N3900 | | | | | | | | | 20 | 20 | 20 |

Table 4 below presents the mechanical properties of the cured model materials obtained in the experiments conducted with formulations (a)-(k) as presented in Tables 3A and 3B above, in molds.

TABLE 4

| Mechanical properties | (a) | (b) | (c) | (d) | (e) | (f) | (g) | (h) | (i) | (j) | (k) |
|---|---|---|---|---|---|---|---|---|---|---|---|
| HDT, ° C. (0.45 MPa) | 155 | 155 | 155 | 155 | 155 | 155 | 155 | 155 | 153 | 155 | 155 |
| Izod, Notched (J/m) | 35-40 | 35-40 | 35-40 | 35-40 | 35-40 | 35-40 | 25 | 19 | 210 | 125 | 220 |

In another set of experiments, Model A formulations containing caprolactam, catalyst, and optionally one or more amine compound(s) which increase the polymerization rate (amine booster(s)), and Model B formulations containing non-blocked polyisocyanate-based activator and optionally caprolactone, were tested. Table 5 below presents the components included in model formulations I-VI used in this set of experiments and the mechanical properties of the cured model materials obtained in the experiments conducted with formulations I-VI in molds.

TABLE 5

| | Model A | | | | | Model B | | A/B weight ratio | HDT, ° C. (0.45 MPa) | Izod Notched (J/m) |
|---|---|---|---|---|---|---|---|---|---|---|
| No. | C10 | ε-CL | IDA | T-403 | C540 | N3900 | ε-CLE | | | |
| I | 31 | 69 | | | | 100 | | 80/20 | 155 | 60 |
| II | 31 | 64 | 5 | | | 100 | | 80/20 | 153 | 65 |
| III | 31 | 64 | | 5 | | 100 | | 80/20 | 155 | 60 |
| IV | 31 | 64 | | | 5 | 100 | | 80/20 | 155 | 140 |
| V | 31 | 64 | | 5 | | 45 | 55 | 70/30 | 155 | 54 |
| VI | 31 | 59 | | 5 | 5 | 27.5 | 72.5 | 60/40 | 75.8 | 850 |

Preliminary experiments were performed on a 3D inkjet printing system, as described herein. It was uncovered that model formulations similar to those used in casting procedure of Nylon6-derived compounds, such as, for example, formulation (a) in Tables 3A and 3B, resulted in insufficient polymerization under the process requirements (data not shown). When the concentration (weight percents) of the catalyst and the activator were increased by 2-5 folds, as shown for example, in formulation (b) in Tables 3A and 3B, still a gel-like polymer was obtained, indicating insufficient reactivity. In addition, contamination of the printing heads was observed.

These preliminary studies have prompted the present inventors to search for various modifications of the model formulations that would meet the process requirements and provide printed objects with sufficiently high HDT, Impact resistance and/or stiffness.

Formulations with a Non-Blocked Polyisocyanate Activator:

In the set of experiments conducted using the formulation systems presented in Table 5, a non-blocked polyisocyanate (e.g., N3900) was used as an activator. Non-blocked polyisocyanates exhibit a very high reactivity and cannot be mixed with the curable monomer before jetting due to reaction between lactam and isocyanate groups. As a result, a non-blocked polyisocyanate should be jetted alone or with a non-reactive component, and therefore only non-equal weights, or a weight ratio other than 1:1, of Model A and Model B formulations could be used during the printing process.

As shown in Table 5, a weight ration of 80:20 Model A/Model B provided high HDT, as in common polyamine casting, and a higher Impact resistance (see, Formulation I, Table 5).

Materials which are non-reactive towards polyisocyanates may be added to the Model B formulation. Exemplary such materials are lactones, as exemplified by Formulations V and VI in Table 5. The addition of lactones to the polyisocyanates allows using higher weight percents of the Model B formulation during the printing process.

As further shown in Table 5, various amine compounds, known and referred to herein as amine boosters, were added to the Model A formulation part. Such amine compounds are typically chemically incompatible with commonly used activators, and are also known to be highly effective when combined with non-blocked polyisocyanate activators.

Figure 3:
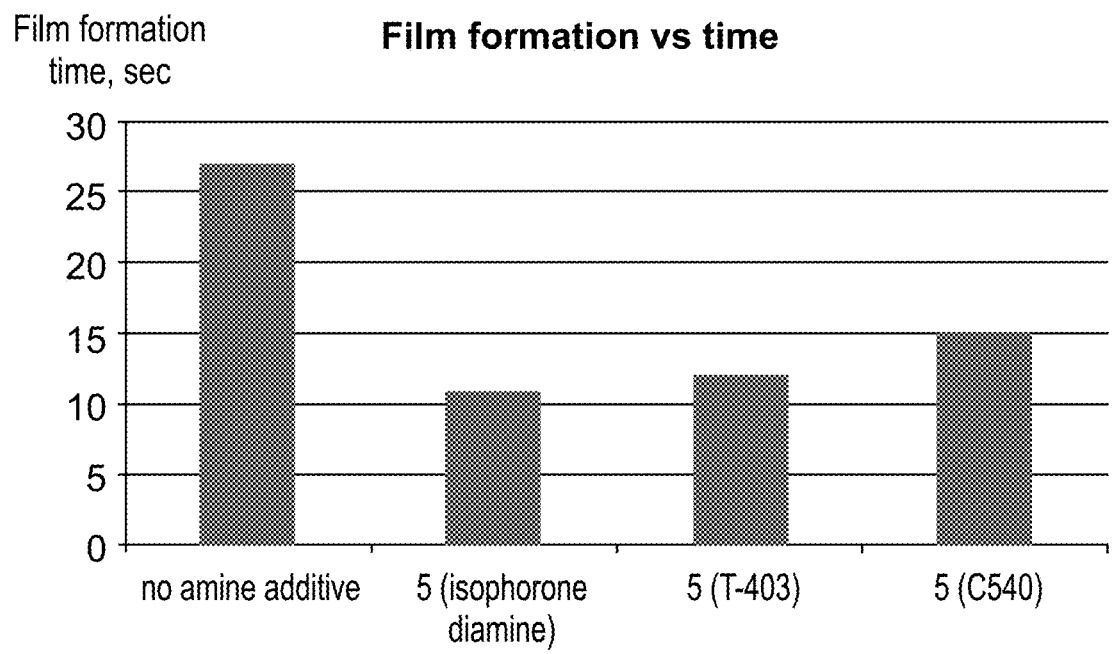
FIG. 3 is a bar graph showing the effect of addition of 5 weight percents of various amine-containing compounds to Model A formulation on the hardening time of polyamide-forming formulations of caprolactam, a catalyst and a non-blocked polyisocyanate activator, shown as formulations I-IV in Table 5.

The effect of the various amine boosters on the hardening (curing) time was tested in molds, and the data obtained for formulations I-IV shown in Table 5 is presented in FIG. 3. As shown in FIG. 3, the addition of these amine compounds substantially reduced the hardening time.

As further shown in Table 5, the amine boosters also provided for a further increase in the Impact resistance, with the most pronounced effect observed for a high molecular weight trifunctional polyether amine (see, Table 5, formulation IV).

Formulations with Caprolactam-Blocked Polyisocyanate Activator:

While superior mechanical properties and curing time were obtained with non-blocked polyisocyanate-based system, the present inventors have continued searching for additional, possibly less reactive, systems, due to observed contamination of the printing system.

The present inventors have therefore studied processes in which a caprolactam-blocked hexamethylene diisocyanates, such as described, for example, in U.S. Pat. No. 9,139,752 (e.g., Bruggolen C20) are used as an activator.

As discussed hereinabove, such formulations resulted in too slow hardening time, and the effect of various amine boosters was tested.

Figure 4:
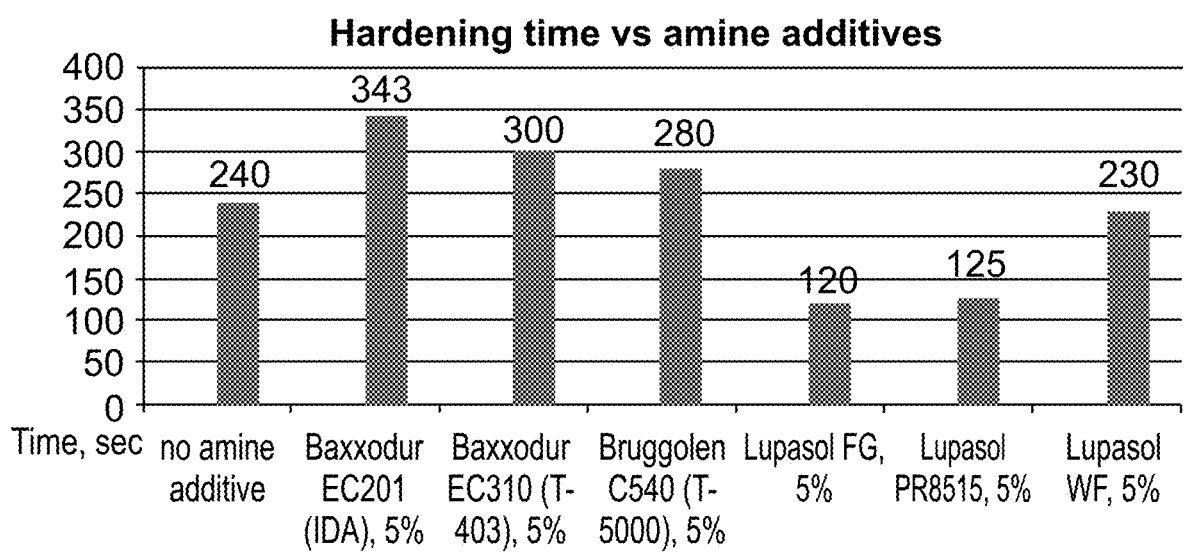
FIG. 4 is a bar graph showing the effect of addition of 5 weight percents of various amine-containing compounds to Model A formulation on the hardening time of polyamide-forming formulations of caprolactam, a catalyst and a CL-blocked hexamethylene diisocyanate activator, shown as formulations (b)-(h) in Tables 3A and 3B.

The obtained data is presented in FIG. 4, and show that low molecular weight polyethylene imine compounds (e.g., PEI FG and PEI PR 8515) provided the most pronounced effect on the curing time.

With the aim of improving the Impact resistance of the obtained cured material, the present inventors have prepared and studied the effect of caprolactam-blocked polyisocyanate as an activator.

This novel activator is used in the Model B formulation, optionally in combination with lactone materials, added as impact modifiers, as exemplified by formulations (i), (j) and (k), in Tables 3A and 3B.

As shown in Table 4, the use of a CL-blocked polyisocyanate provided for an exceptional increase in the Impact resistance of the cured material.

Additional Components:

As shown in Tables 4 and 5, addition of lactone-based thermally-curable materials resulted in and improved kinetics (reduced curing time) and increased Impact resistance of the cured material. Thus, compounds such as ε-caprolactone and/or pentadecalactone can be added to one or both model formulations.

Further, while contamination of printing heads and orifice plate was observed using most of the tested formulations during 3D inkjet printing processes, it was hypothesized that evaporation of caprolactam and, as a result, precipitation of the catalyst, occur at the jetting temperature and results in nozzle clogging.

The present inventors have therefore conceived that model formulations with lower melting points would allow jetting at lower temperatures, and would thus reduce caprolactam evaporation and avoid contamination. Lowering the melting point is achieved by adding to the formulation (e.g., the Model A, catalyst-containing formulation) curable and/or non-curable materials, at a concentration ranging from 0.1% to 50%, or from 0.5% to 25%, or from 1% to 10%, or from 3% to 6% by weight of the total weight of the catalyst-containing formulation. The added curable and/or non-curable materials can be any material other than the main components that participate in the basic polyamide formation (e.g., other than the curable caprolactam, the catalyst and the activator). An exemplary such additive includes laurolactam. For example, 10% laurolactam reduced m.p. of Model A from 69° C. to 58° C. (see, Formulation k, Table 3A).

Example 2

Process Modifications

Post-Process Treatment:

The present inventors have uncovered that following the 3D inkjet printing process, a cured material which is not fully polymerized, and typically exhibits a relatively low HDT of about 40-50° C., can be obtained.

In order to achieve higher HDT values, thermal post process is required in order to complete the polymerization and obtain cured material featuring HDT of 150° C.

For example, the present inventors have successfully practiced a thermal post-process curing for 1 hour at 150° C.

In order to monitor polymerization completion, weight loss upon the post-process thermal treatment was measured. Weight of the cured material was measured prior to and following thermal post process.

A minimum weight loss during post-process (e.g., of about 1.5-2.5% by weight), is indicative of a successful printing and of obtaining a printed object with mechanical properties identical to those polymerized in molds.

Printing Data Selection:

In exemplary embodiments of the 3D inkjet printing processes described herein, Model A and Model B formulations are jetted at equal weight, namely at a 1:1 weight ratio, which can be realized by jetting the same number of equal-weight or approximately equal-weight drops for each of Model and Model B formulations.

Such a process can be performed in more than one way.

In some embodiments of the present invention a "Drop on Drop" printing protocol is employed. These embodiments are schematically illustrated in FIGS. 5A and 5B. A bitmap suitable for the deposition of the catalyst-containing formulation is illustrated in FIG. 5A and a bitmap suitable for the deposition of the activator-containing formulation is illustrated in FIG. 5B. White boxes represent vacant locations, dotted boxes represent droplets of catalyst-containing (Model A) formulation and wavy boxes represent droplets of activator-containing (Model B) formulation. The printing data in these embodiments are such that for each layer, both formulations are deposited at the same location, but different times, during movement of the printing head. For example, each droplet of a catalyst-containing formulation (e.g., Model A formulation) can be jetted on top of a droplet of an activator-containing formulation (e.g., Model B formulation), or vice versa. Preferably, the two formulation parts are jetted in drops at the same weight and velocity. A representative example for a resolution suitable for the present embodiments is 1200 dpi in the X direction and 300 dpi in the Y direction. The drop on drop printing protocol allows the two types of drops to combine and mix before the crystallization of deposited material.

In some embodiments of the present invention a "side by side" printing protocol is employed. These embodiments are schematically illustrated in FIGS. 6A and 6B. A bitmap suitable for the deposition of the catalyst-containing (Model A) formulation is illustrated in FIG. 6A and a bitmap suitable for the deposition of the activator-containing (Model B) formulation is illustrated in FIG. 6B. The white, dotted and wavy boxes represent vacant locations, droplets of catalyst-containing formulation and droplets of activator-containing formulation, respectively. The printing data in these embodiments is such that for each layer, each drop of a catalyst-containing formulation (e.g., Model A formulation) is jetted adjacent to a drop of an activator-containing formulation (e.g., Model B formulation), or vice versa. Due to drop spreading, the adjacent drops tend to partially overlap. As a result, the two drops diffuse toward each other, mix and polymerize after deposition.

In the schematic illustrations shown in FIGS. 5A-6B, chessboard bitmaps are illustrated, but this need not necessarily be the case, since, for some applications, other bitmap patterns can be employed.

The weight loss of the cured object obtained upon 3D inkjet printing of formulation (c) in Tables 3A and 3B, using the Dror on Drop" pattern and the "side by side" pattern was measured.

Table 6 presents the formulations components and the obtained mechanical data for the cured printed object. Weight loss was determined as 1.5-2.5% weight.

TABLE 6

| Part A | | | Part B | | Mold HDT: 155° C. (0.45 Mpa) | Printed HDT: 155° C. (0.45 Mpa) |
|---|---|---|---|---|---|---|
| C10 | ε-CL | PEI FG | C20 | ε-CL | | |
| 50% | 45% | 5% | 34.67% | 65.33% | Izod notch: 35 J/m | Izod notch: 25 J/m |

In a comparative example, deposition of the same two formulations at the same weight ratio (50:50 w/w) but in a side by side printing protocol was performed, and resulted in weight loss of up to 50% by weight.

These data suggest that selecting a Drop-on-Drop printing mode in which combining the two formulations occurs within each pixel, layer by layer, and distribution of the two formulations within each layer is homogeneous/isotropic, is superior to the "side by side" printing protocol.

Alternatively, or in addition, printing data is selected such that different ratios of formulations A and B are selected at each voxel level, as described herein, so as to provide a printed object with controllable mechanical properties at the voxel level.

The present inventors have studied the effect of various A/B weight ratios of a selected formulation on the mechanical properties of the obtained cured polyamide material. The obtained data is presented in Tables 7A-7C.

Jet A in an exemplary Model A formulation, and Jet B is an exemplary Model B formulation.

TABLE 7A

| (A/B = 50:50 wt. %) | | | | | | | | |
|---|---|---|---|---|---|---|---|---|
| Jet A | | | Jet B | | | | Izod, | |
| C10 | ε-CL | PEI FG | BL-N3900 | ε-CL | ε-CLE | HDT | notched | DMA* |
| 25% | 72.5% | 2.5% | 20% | 30% | 50% | 153° C. | 210 J/m | 59° C. |

TABLE 7B

| (A/B = 70:30 wt. %) | | | | | | | | | |
|---|---|---|---|---|---|---|---|---|---|
| Jet A | | | Jet B | | | | Izod, | | DMA (Tan |
| C10 | ε-CL | PEI FG | BL-N3900 | ε-CL | ε-CLE | HDT | notched | DMA* | Delta, Tg) |
| 25% | 72.5% | 2.5% | 20% | 30% | 50% | 155° C. | 25 J/m | 74° C. | 80° C. |

TABLE 7C

| (A/B = 40:60 wt. %) | | | | | | | |
|---|---|---|---|---|---|---|---|
| Jet A | | | Jet B | | | | Izod, |
| C10 | ε-CL | PEI FG | BL-N3900 | ε-CL | ε-CLE | HDT | notched |
| 25% | 72.5% | 2.5% | 20% | 30% | 50% | 48.7° C. | 390 J/m |

The obtain data demonstrate that HDT, Impact resistance and stiffness of the cured material can be controlled by selecting the A/B weight ratio. At higher amount of part B, a cured material with high Impact is achieved. At higher amount of part A, a cured material with higher stiffness is achieved.

Example 3

Preferred System

The formulations of the present embodiments can be deposited, for example, using a system marketed as Objet Connex™ (Stratasys Ltd., Israel). Thermal curing conditions can be achieved, for example, using a ceramic lamp providing temperature of from about 400° C. to about 900° C., and wavelength of from about 2.4 μm to about 4.3 μm. Additionally or alternatively, the printing tray 60 can be heated to a temperature of from about 50° C. to about 180° C., and the printing chamber can be heated to a temperature of from about 50° C. to about 90° C.

In some embodiments of the present invention the printing system is sealed and is optionally and preferably equipped with one or more filters. These embodiments are useful for keeping the printing environment generally dry and inert. These embodiments are also useful for reducing or preventing entry of moisture into the system. Moisture can also be reduced alternatively or additionally using by means of a gas, such as an inert gas or inert gas mixture, that fills the chamber as further detailed hereinabove. Use of a drying filter is also contemplated. For example, the gas forming the printing environment within the printing chamber can be circulated through the drying filter.

In some embodiments of the present invention the printing block is thermally isolated from the printing chamber. These embodiments are particularly useful when it is desired to employ jetting at different temperatures.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of fabricating an object which comprises at least one polyamide material, by three-dimensional inkjet printing, the method comprising:
  receiving three-dimensional printing data corresponding to the shape of the object;
  dispensing droplets of at least a first model formulation and a second model formulation in layers, on a receiving medium, according to said printing data; and
  exposing said layers to a curing energy, said curing energy comprising heat,
  wherein said first model formulation comprises a lactam and a catalyst for inducing anionic ring opening polymerization of said lactam, and said second model formulation comprises an activator for promoting said anionic ring opening polymerization of said lactam,
  and wherein at least one of said first and second model formulations further comprises a compound capable of increasing a rate of said polymerization upon exposure to said curing energy,
  wherein:
  said activator is or comprises a non-blocked polyisocyanate; and
  said compound capable of increasing said polymerization rate is a multifunctional polyether amine having a molecular weight of at least 1000 grams/mol,
  and wherein the method further comprises selecting a ratio A:B of said first model formulation and said second model formulation, wherein A represents the part by weight of said first model formulation and B represents a part by weight of said second formulation; and dispensing said droplets in accordance with said ratio,
  wherein said ratio ranges from about 1.5:1 to about 5:1, thereby fabricating the object.

2. The method of claim 1, wherein:
said ratio is about 4:1.

3. The method of claim 1, further comprising selecting a ratio of said first model formulation and said second model formulation, wherein for at least one region of the object, said dispensing of said droplets is selected to form voxel blocks, wherein, for each block, a ratio between a number of voxels of said first composition in said block and a number of voxels of said second composition in said block corresponds to said selected ratio.

4. The method of claim 1, wherein said first model formulation further comprises at least one material selected for reducing a melting point of said formulation.

5. The method of claim 1, wherein said first model formulation is such that features a melting point lower than 68° C., or lower than 65° C., or lower than 62° C., or lower than 60° C.

* * * * *